United States Patent
Kim et al.

(10) Patent No.: US 10,148,409 B2
(45) Date of Patent: Dec. 4, 2018

(54) METHOD AND DEVICE FOR RECEIVING SIGNAL IN WIRELESS ACCESS SYSTEM SUPPORTING FDR TRANSMISSION

(71) Applicant: LG ELECTRONICS INC., Seoul (KR)

(72) Inventors: Jinmin Kim, Seoul (KR); Jaehoon Chung, Seoul (KR); Genebeck Hahn, Seoul (KR); Eunjong Lee, Seoul (KR); Kukheon Choi, Seoul (KR); Kwangseok Noh, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 68 days.

(21) Appl. No.: 15/118,771

(22) PCT Filed: Feb. 16, 2015

(86) PCT No.: PCT/KR2015/001544
§ 371 (c)(1),
(2) Date: Aug. 12, 2016

(87) PCT Pub. No.: WO2015/122733
PCT Pub. Date: Aug. 20, 2015

(65) Prior Publication Data
US 2017/0054546 A1 Feb. 23, 2017

Related U.S. Application Data

(60) Provisional application No. 61/940,474, filed on Feb. 16, 2014.

(51) Int. Cl.
*H04W 72/04* (2009.01)
*H04L 5/22* (2006.01)
(Continued)

(52) U.S. Cl.
CPC .............. *H04L 5/22* (2013.01); *H04B 7/26* (2013.01); *H04W 72/0446* (2013.01); *H04W 72/1289* (2013.01); *H04W 72/0406* (2013.01)

(58) Field of Classification Search
None
See application file for complete search history.

(56) References Cited

U.S. PATENT DOCUMENTS

2013/0301401 A1* 11/2013 Wang .................. H04L 5/001
370/209
2014/0153453 A1* 6/2014 Park .................... H04B 7/2656
370/280

FOREIGN PATENT DOCUMENTS

EP          2945447 A1 * 11/2015  ............ H04W 16/14
WO     WO 2013/012190 A2    1/2013
WO     WO 2013/191420 A2    1/2013

OTHER PUBLICATIONS

Catt, "Remaining Details of L1 Signaling for UL-DL Reconfiguration," R1-140067, 3GPP TSG RAN WG1 Meeting #76, Prague, Czech Republic, Feb. 10-14, 2014 (available Jan. 31, 2014), 6 pages.

(Continued)

*Primary Examiner* — Ayanah George
(74) *Attorney, Agent, or Firm* — Birch, Stewart, Kolasch & Birch, LLP

(57) ABSTRACT

The present invention relates to a wireless access system supporting a full duplex radio (FDR) transmission environment. A signal transmission and reception method of a base station for a signal in a wireless access system supporting a FDR, according to one embodiment of the present invention, comprises the steps of: transmitting, to a terminal, an indicator which notifies of an application of terminal-specific time division duplex (TDD); transmitting, to the terminal, frame setting information according to the terminal- (Continued)

specific TDD; and transmitting and receiving a signal to and from the terminal on the basis of the frame setting information, wherein the frame setting information is capable of being set on the basis of a first constraint in which a first subframe is a downlink subframe and a special subframe always exists.

2 Claims, 23 Drawing Sheets

(51) Int. Cl.
*H04B 7/26* (2006.01)
*H04W 72/12* (2009.01)

(56) References Cited

OTHER PUBLICATIONS

Interdigital, "On Signaling and Fallback Operation for TDD UL-DL Reconfiguration," R1-133175, 3GPP TSG-RAN WG1 Meeting #74, Barcelona, Spain, Aug. 19-23, 2013 (available Aug. 10, 2013), 5 pages.
Samsung, "Signaling for TDD UL-DL Reconfiguration," R1-140348, 3GPP TSG RAN WG1 #76, Prague, Czech Republic, Feb. 10-14, 2014 (available Feb. 1, 2014), p. 1-5.

* cited by examiner

FIG. 5
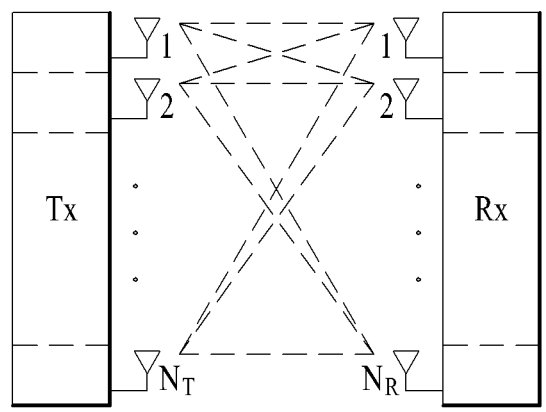
(a)
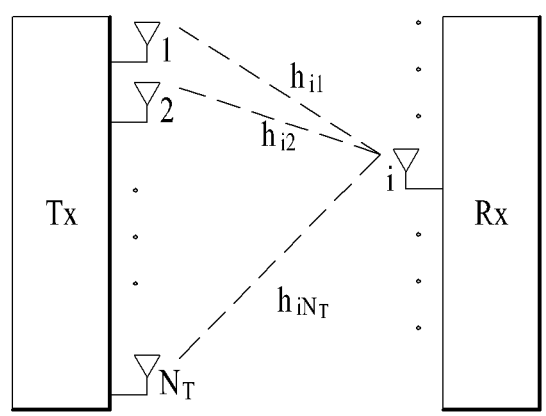
(b)

before ADC after ADC after digital
cancellation
and scaling

FIG. 19

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

FIG. 22

| DL subframe | Spcial subframe | UL subframe | UL subframe | UL subframe | UL subframe | DL subframe | DL subframe | DL subframe | DL subframe |

FIG. 23

| DL subframe | Spcial subframe | UL subframe | UL subframe | DL subframe | DL subframe | DL subframe | DL subframe | DL subframe | DL subframe |

FIG. 24

| DL subframe | Spcial subframe | UL subframe | UL subframe | UL subframe | DL subframe | Spcial subframe | UL subframe | UL subframe | UL subframe |
|---|---|---|---|---|---|---|---|---|---|

FIG. 25

| D | S | U | U | D | D | S | U | U | D |
|---|---|---|---|---|---|---|---|---|---|

FIG. 26

| TDD/UL/DL Comfiguration | subframe number n | | | | | | | | | |
|---|---|---|---|---|---|---|---|---|---|---|
| | 0 | 1 | 2 | 3 | 4 | 5 | 6 | 7 | 8 | 9 |
| 0 | 4 | 6 | | | | 4 | 6 | | | |
| 1 | | 6 | | | 4 | | 6 | | | 4 |
| 2 | | | | 4 | | | | | 4 | |
| 3 | | 4 | | | | | | | 4 | 4 |
| 4 | | | | | | | | | 4 | 4 |
| 5 | | | | | | | | | 4 | |
| 6 | 7 | 7 | | | 7 | 7 | | | | 5 |

FIG. 27

| Scheduling subframe indication value | 0000 | 0001 | 0010 | 0011 | 0100 | 0101 | 0110 | 0111 | 1000 | 1001 | 1010~1111 |
|---|---|---|---|---|---|---|---|---|---|---|---|
| Subframe number | n | n+1 | n+2 | n+3 | n+4 | n+5 | n+6 | n+7 | n+8 | n+9 | reserved |

METHOD AND DEVICE FOR RECEIVING SIGNAL IN WIRELESS ACCESS SYSTEM SUPPORTING FDR TRANSMISSION

CROSS REFERENCE TO RELATED APPLICATIONS

This application is the National Phase of PCT International Application No. PCT/KR2015/001544, filed on Feb. 16, 2015, which claims priority under 35 U.S.C. 119(e) to U.S. Provisional Application No. 61/940,474, filed on Feb. 16, 2014, all of which are hereby expressly incorporated by reference into the present application.

TECHNICAL FIELD

The present invention relates to a wireless access system supporting a Full Duplex Radio (FDR) transmission environment and, more particularly, to a method for efficiently transmitting and receiving a signal when FDR is applied and an apparatus supporting the same.

BACKGROUND ART

Wireless communication systems have been widely used to provide various kinds of communication services such as voice or data services. Generally, a wireless communication system is a multiple access system that can communicate with multiple users by sharing available system resources (bandwidth, transmission (Tx) power, and the like). A variety of multiple access systems can be used. For example, a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency-Division Multiple Access (SC-FDMA) system, a Multi-Carrier Frequency Division Multiple Access (MC-FDMA) system, and the like.

DISCLOSURE OF THE INVENTION

Technical Task

An object of the present invention is to provide methods for efficiently transmitting and receiving a signal in a wireless access system supporting FDR transmission.

Another object of the present invention is to provide an apparatus supporting the above methods.

The technical objects that can be achieved through the present invention are not limited to what has been particularly described hereinabove and other technical objects not described herein will be more clearly understood by persons skilled in the art from the following detailed description.

Technical Solutions

According to an aspect of the present invention devised to solve the above problems, a method of transmitting and receiving signals by an evolved node B (eNB) in a wireless access system supporting FDR (full duplex radio) may include: transmitting, to a user equipment (UE), an indicator indicating that UE-specific TDD (time division multiplexing) is applied; transmitting, to the UE, frame configuration information in accordance with the UE-specific TDD; and transmitting and receiving the signals to and from the UE on the basis of the frame configuration information. In this case, the frame configuration information may be set based on a first restriction in which a first subframe is a downlink subframe and a special subframe always exists.

When a configuration period includes X of subframes, the number of bits of the frame configuration information may be set to (X−2).

The frame configuration information may be set by adding a second restriction in which uplink subframes and downlink subframes are allocated consecutively and an uplink subframe is allocated to the back of the special subframe.

The frame configuration information may be set based on a third restriction in which the special subframe is allocated to a second subframe.

When a configuration period includes X of subframes, the number of bits of the frame configuration information is set as an integer obtained by rounding up a value of log 2(X−2).

The frame configuration information may be set based on a fourth restriction in which an uplink subframe is allocated to the back of the special subframe.

The frame configuration information may be set based on a fifth restriction in which uplink subframes and downlink subframes are allocated consecutively.

According to another aspect of the present invention, an evolved node B (eNB) for transmitting and receiving signals in a wireless access system supporting FDR (full duplex radio) may include an RF (radio frequency) unit and a processor. The processor may be configured to transmit, to a user equipment (UE), an indicator indicating that UE-specific TDD (time division multiplexing) is applied, transmit frame configuration information in accordance with the UE-specific TDD to the UE, and transmit and receive the signals to and from the UE on the basis of the frame configuration information. In this case, the frame configuration information may be set based on a first restriction in which a first subframe is a downlink subframe and a special subframe always exists.

When a configuration period includes X of subframes, the number of bits of the frame configuration information may be set to (X−2).

The frame configuration information may be set by adding a second restriction in which uplink subframes and downlink subframes are allocated consecutively and an uplink subframe is allocated to the back of the special subframe.

The frame configuration information may be set based on a third restriction in which the special subframe is allocated to a second subframe.

When a configuration period includes X of subframes, the number of bits of the frame configuration information is set as an integer obtained by rounding up a value of log 2(X−2).

The frame configuration information may be set based on a fourth restriction in which an uplink subframe is allocated to the back of the special subframe.

The frame configuration information may be set based on a fifth restriction in which uplink subframes and downlink subframes are allocated consecutively.

The foregoing general description and following detailed description of the present invention are exemplary and explanatory and are intended to provide further explanation of the invention claimed.

Advantageous Effects

According to embodiments of the present invention, the following effect can be obtained.

Data can be efficiently transferred in a wireless access system supporting FDR transmission.

The Effect obtainable from the present invention are not limited to what has been particularly described hereinabove and other advantages not described herein will be more clearly understood by persons skilled in the art from the following detailed description of the present invention. That is, unintended effects of the present invention may also be derived by those skilled in the art from the embodiments of the present invention.

DESCRIPTION OF DRAWINGS

FIG. 5 is a diagram for a configuration of a wireless communication system supporting multiple antennas.

FIG. 19 illustrates examples of frame configurations according to the radio frame structure of FIG. 18 (b).

FIGS. 20 to 24 illustrates examples of UL/DL configuration according to the present invention.

FIG. 25 illustrates an existing UL/DL configuration with a ratio of DL subframes to UL subframes set to 1:1.

FIG. 26 illustrates an example of a PDCCH transmission duration for PUSCH transmission in TDD.

FIG. 27 is a diagram illustrating scheduling subframe indication values and subframe numbers.

BEST MODE FOR INVENTION

Figure 1:
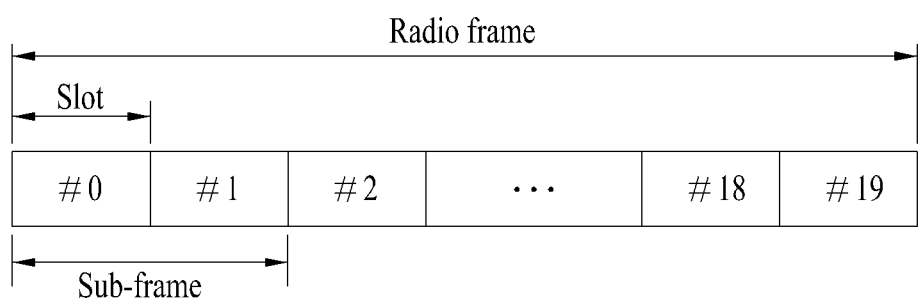
FIG. 1 is a diagram illustrating an example of a downlink radio frame structure.

The following embodiments are proposed by combining constituent components and characteristics of the present invention according to a predetermined format. The individual constituent components or characteristics should be considered to be optional factors on the condition that there is no additional remark. If required, the individual constituent components or characteristics may not be combined with other components or characteristics. Also, some constituent components and/or characteristics may be combined to implement the embodiments of the present invention. The order of operations to be disclosed in the embodiments of the present invention may be changed to another. Some components or characteristics of any embodiment may also be included in other embodiments, or may be replaced with those of the other embodiments as necessary.

The embodiments of the present invention are disclosed on the basis of a data communication relationship between a Base Station (BS) and a terminal. In this case, the BS is used as a terminal node of a network via which the BS can directly communicate with the terminal. Specific operations to be conducted by the BS in the present invention may also be conducted by an upper node of the BS as necessary.

In other words, it will be obvious to those skilled in the art that various operations for enabling the BS to communicate with the terminal in a network composed of several network nodes including the BS will be conducted by the BS or other network nodes other than the BS. The term "BS" may be replaced with a fixed station, Node B, evolved Node B (eNB or eNode B), or an Access Point (AP) as necessary. The term "relay" may be replaced with a Relay Node (RN) or a Relay Station (RS). The term "terminal" may also be replaced with a User Equipment (UE), a Mobile Station (MS), a Mobile Subscriber Station (MSS) or a Subscriber Station (SS) as necessary.

It should be noted that specific terms disclosed in the present invention are proposed for the convenience of description and better understanding of the present invention, and the use of these specific terms may be changed to another format within the technical scope or spirit of the present invention.

In some instances, well-known structures and devices are omitted in order to avoid obscuring the concepts of the present invention and the important functions of the structures and devices are shown in block diagram form. The same reference numbers will be used throughout the drawings to refer to the same or like parts.

Embodiments of the present invention are supported by standard documents disclosed for at least one of wireless access systems including an Institute of Electrical and Electronics Engineers (IEEE) 802 system, a $3^{rd}$ Generation Project Partnership (3GPP) system, a 3GPP Long Term Evolution (LTE) system, and a 3GPP2 system. In particular, the steps or parts, which are not described to clearly reveal the technical idea of the present invention, in the embodiments of the present invention may be supported by the above documents. All terminology used herein may be supported by at least one of the above-mentioned documents.

The following embodiments of the present invention can be applied to a variety of wireless access technologies, for example, Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), and the like. CDMA may be embodied with wireless (or radio) technology such as Universal Terrestrial Radio Access (UTRA) or CDMA2000. TDMA may be embodied with wireless (or radio) technology such as Global System for Mobile communications (GSM)/General Packet Radio Service (GPRS)/Enhanced Data Rates for GSM Evolution (EDGE). OFDMA may be embodied with wireless (or radio) technology such as Institute of Electrical and Electronics Engineers (IEEE) 802.11 (Wi-Fi), IEEE 802.16 (WiMAX), IEEE 802-20, and Evolved UTRA (E-UTRA). UTRA is a part of Universal Mobile Telecommunications System (UMTS). 3rd Generation Partnership Project Long Term Evolution (3GPP LTE) is a part of Evolved UMTS (E-UMTS), which uses E-UTRA. 3GPP LTE employs OFDMA in downlink and employs SC-FDMA in uplink. LTE-Advanced (LTE-A) is an evolution of 3GPP LTE. WiMAX can be explained by an IEEE 802.16e (WirelessMAN-OFDMA Reference System) and an advanced IEEE 802.16m (WirelessMAN-OFDMA Advanced System). For clarity, the following description focuses on the 3GPP LTE and LTE-A systems. However, the technical features of the present invention are not limited thereto.

The structure of a downlink radio frame will be described with reference to FIG. 1.

In a cellular Orthogonal Frequency Division Multiplexing (OFDM) radio packet communication system, uplink/downlink data packets are transmitted in subframes. One subframe is defined as a predetermined time interval including a plurality of OFDM symbols. The 3GPP LTE standard supports a type 1 radio frame structure applicable to Frequency Division Duplex (FDD) and a type 2 radio frame structure applicable to Time Division Duplex (TDD).

FIG. 1 is a diagram illustrating the structure of the type 1 radio frame. A downlink radio frame includes 10 subframes, and one subframe includes two slots in the time domain. A time required for transmitting one subframe is defined as a Transmission Time Interval (TTI). For example, one subframe may have a length of 1 ms and one slot may have a length of 0.5 ms. One slot may include a plurality of OFDM symbols in the time domain and include a plurality of Resource Blocks (RBs) in the frequency domain. Since the 3GPP LTE system uses OFDMA in downlink, the OFDM symbol indicates one symbol duration. The OFDM symbol may be called an SC-FDMA symbol or symbol duration. An RB is a resource allocation unit including a plurality of contiguous subcarriers in one slot.

The number of OFDM symbols included in one slot may be changed according to the configuration of a Cyclic Prefix (CP). There are an extended CP and a normal CP. For example, the number of OFDM symbols included in one slot may be seven in case of a normal CP. In case of an extended CP, the length of one OFDM symbol is increased and thus the number of OFDM symbols included in one slot is less than that in case of a normal CP. In case of the extended CP, for example, the number of OFDM symbols included in one slot may be six. If a channel state is instable as is the case when a UE moves fast, the extended CP may be used in order to further reduce interference between symbols.

In case of a normal CP, since one slot includes seven OFDM symbols, one subframe includes 14 OFDM symbols. The first two or three OFDM symbols of each subframe may be allocated to a Physical Downlink Control Channel (PDCCH) and the remaining OFDM symbols may be allocated to a Physical Downlink Shared Channel (PDSCH).

The structure of the radio frame is only exemplary. Accordingly, the number of subframes included in a radio frame, the number of slots included in a subframe or the number of symbols included in a slot may be changed in various manners.

Figure 2:
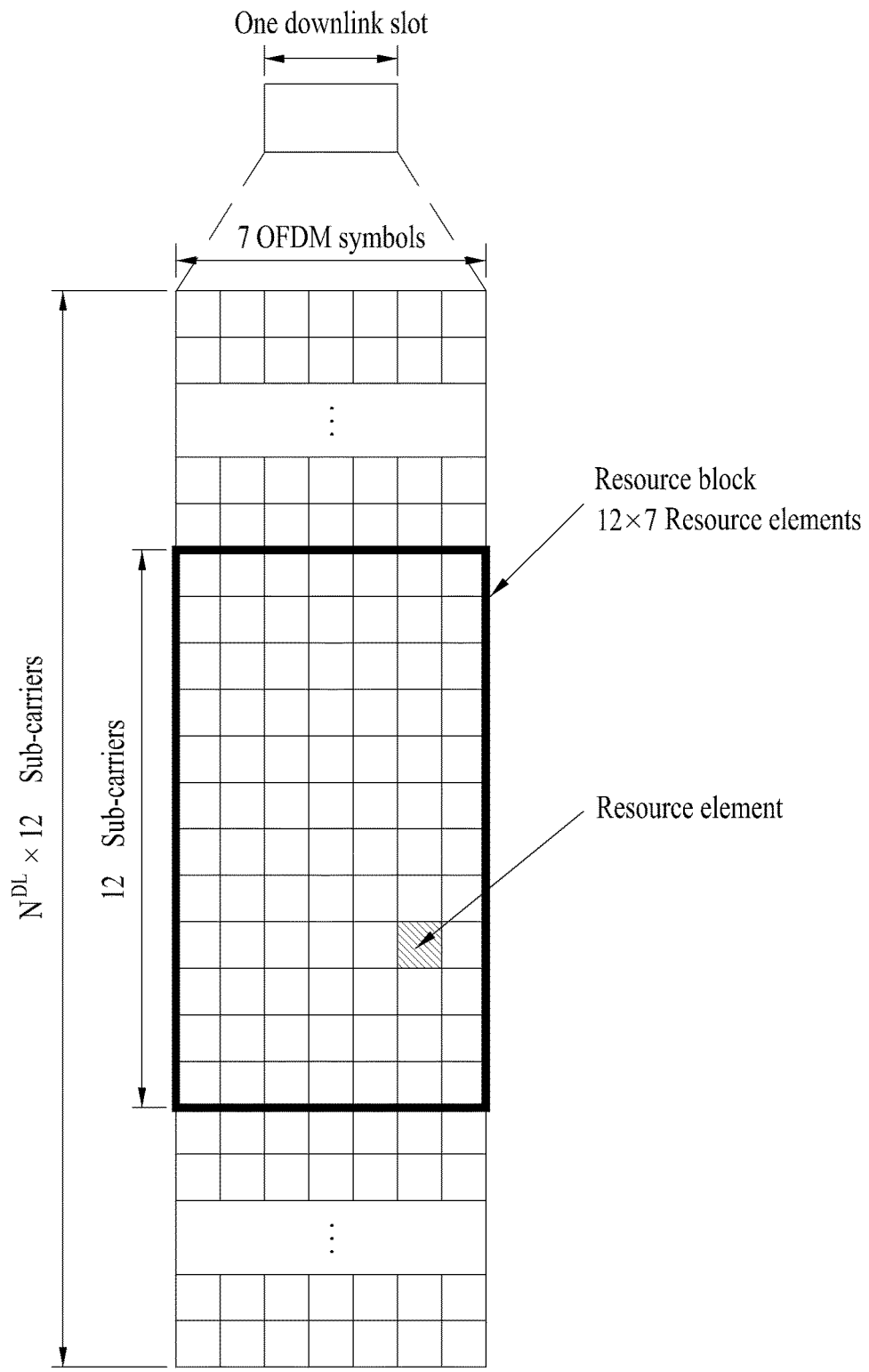
FIG. 2 is a diagram illustrating an example of a resource grid for a downlink slot

FIG. 2 is a diagram illustrating an example of a resource grid in one downlink slot. OFDM symbols are configured by the normal CP. Referring to FIG. 2, the downlink slot includes a plurality of OFDM symbols in the time domain and includes a plurality of RBs in the frequency domain. Although FIG. 2 exemplarily depicts that one downlink slot includes seven OFDM symbols and one RB includes 12 subcarriers, the present invention is not limited thereto. Each element of the resource grid is referred to as a Resource Element (RE). For example, an RE a(k,l) is located at a kth subcarrier and an lth OFDM symbol. In case of a normal CP, one RB includes 12 7 REs (in case of an extended CP, one RB includes 12 6 REs). Since the spacing between subcarriers is 15 kHz, one RB is about 180 kHz in the frequency domain. NDL denotes the number of RBs included in the downlink slot. NDL is determined based on a downlink transmission bandwidth set through Node B scheduling.

Figure 3:
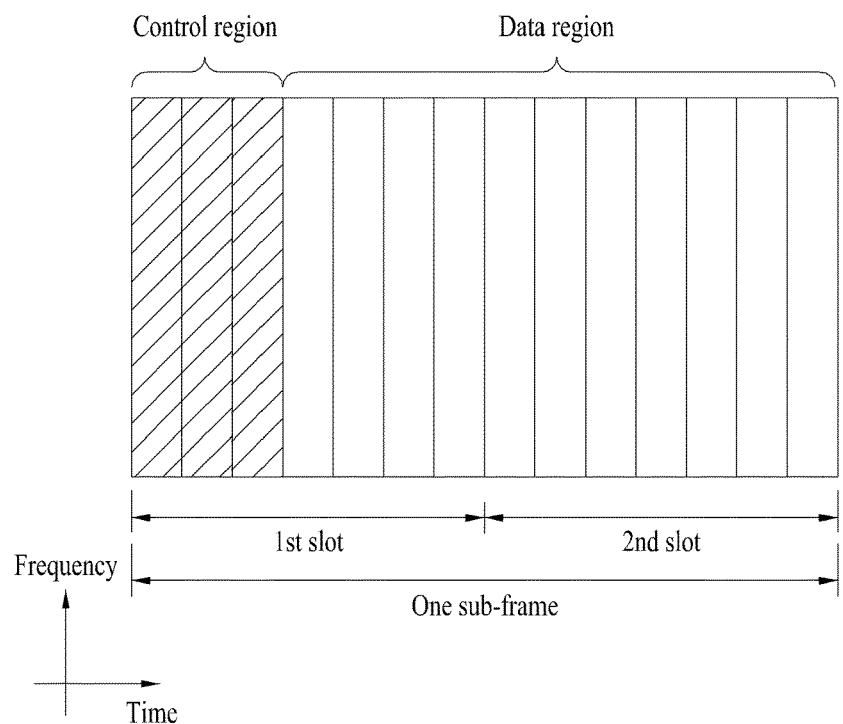
FIG. 3 is a diagram illustrating a structure of a downlink subframe.

FIG. 3 is a diagram illustrating the structure of a downlink subframe. Up to three OFDM symbols at the start of a first slot of one subframe corresponds to a control region to which a control channel is allocated. The remaining OFDM symbols correspond to a data region to which a Physical Downlink Shared Channel (PDSCH) is allocated. A basic transmission unit is one subframe. That is, a PDCCH and a PDSCH are allocated across two slots. Examples of the downlink control channels used in the 3GPP LTE system include, for example, a Physical Control Format Indicator Channel (PCFICH), a Physical Downlink Control Channel (PDCCH), a Physical Hybrid automatic repeat request Indicator Channel (PHICH), etc. The PCFICH is located in the first OFDM symbol of a subframe, carrying information about the number of OFDM symbols used for control channels in the subframe. The PHICH includes a HARQ ACKnowledgment/Negative ACKnowledgment (ACK/NACK) signal as a response to an uplink transmission. The control information transmitted on the PDCCH is referred to as Downlink Control Information (DCI). The DCI includes uplink or downlink scheduling information or an uplink transmit power control command for a certain UE group. The PDCCH may include information about resource allocation and transmission format of a Downlink Shared Channel (DL-SCH), resource allocation information of an Uplink Shared Channel (UL-SCH), paging information of a Paging Channel (PCH), system information on the DL-SCH, information about resource allocation of an higher layer control message such as a Random Access Response (RAR) transmitted on the PDSCH, a set of transmit power control commands for individual UEs in a certain UE group, transmit power control information, information about activation of Voice over IP (VoIP), etc. A plurality of PDCCHs may be transmitted in the control region. A UE may monitor the plurality of PDCCHs. The PDCCHs are transmitted on an aggregation of one or several contiguous Control Channel Elements (CCEs). A CCE is a logical allocation unit used to provide the PDCCHs at a coding rate based on the state of a radio channel. The CCE includes a set of REs. A format and the number of available bits for the PDCCH are determined based on the correlation between the number of CCEs and the coding rate provided by the CCEs. The BS determines a PDCCH format according to DCI to be transmitted to the UE, and attaches a Cyclic Redundancy Check (CRC) to control information. The CRC is masked by a Radio Network Temporary Identifier (RNTI) according to the owner or usage of the PDCCH. If the PDCCH is for a specific UE, the CRC may be masked by a cell-RNTI (C-RNTI) of the UE. If the PDCCH is for a paging message, the CRC may be masked by a paging indicator identifier (P-RNTI). If the PDCCH is for system information (more specifically, a System Information Block (SIB)), the CRC may be masked by a system information identifier and a System Information RNTI (SI-RNTI). To indicate a random access response to a random access preamble received from the UE, the CRC may be masked by a random access-RNTI (RA-RNTI).

Figure 4:
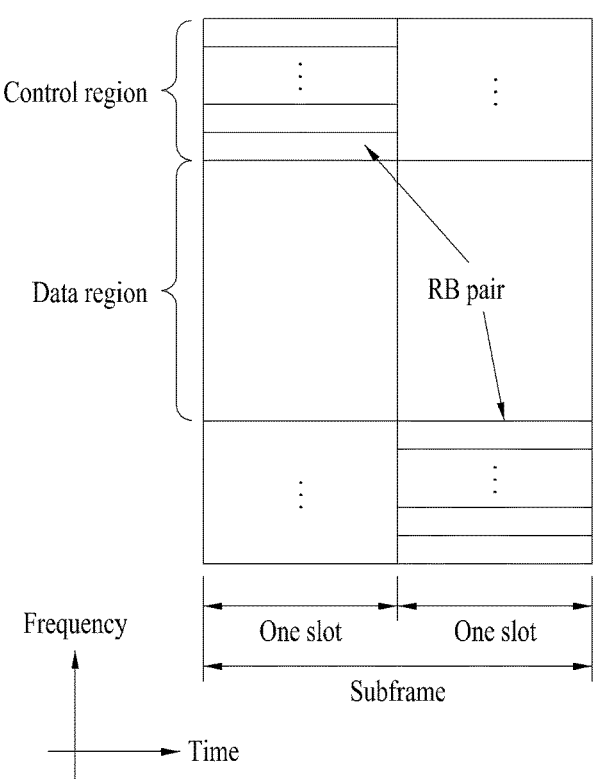
FIG. 4 is a diagram illustrating a structure of an uplink subframe.

FIG. 4 is a diagram illustrating the structure of an uplink subframe. The uplink subframe may be divided into a control region and a data region in the frequency domain. A Physical Uplink Control Channel (PUCCH) including uplink control information is allocated to the control region. A Physical uplink Shared Channel (PUSCH) including user data is allocated to the data region. In order to maintain single carrier property, one UE does not simultaneously transmit the PUCCH and the PUSCH. A PUCCH for one UE is allocated to an RB pair in a subframe. The RBs of the RB pair occupy different subcarriers in two slots. Thus, the RB pair allocated to the PUCCH is "frequency-hopped" over a slot boundary.

Modeling of Multiple Input Multiple Output (MIMO) System

The MIMO system increases data transmission/reception efficiency using a plurality of Tx antennas and a plurality of Rx antennas. MIMO is an application of putting data segments received from a plurality of antennas into a whole message, without depending on a single antenna path to receive the whole message.

MIMO schemes are classified into spatial diversity and spatial multiplexing. Spatial diversity increases transmission reliability or a cell radius using diversity gain and thus is suitable for data transmission for a fast moving UE. In spatial multiplexing, multiple Tx antennas simultaneously transmit different data and thus high-speed data can be transmitted without increasing a system bandwidth.

FIG. 5 illustrates the configuration of a wireless communication system supporting multiple antennas. Referring to FIG. 5(a), when the number of Transmission (Tx) antennas and the number of Reception (Rx) antennas are increased to NT and NR, respectively at both a transmitter and a receiver, a theoretical channel transmission capacity increases in proportion to the number of antennas, compared to use of a plurality of antennas at only one of the transmitter and the receiver. Therefore, transmission rate and frequency efficiency are remarkably increased. Along with the increase of channel transmission capacity, the transmission rate may be increased in theory to the product of a maximum transmission rate Ro that may be achieved in case of a single antenna and a rate increase rate Ri.

$$R_i = \min(N_T, N_R) \quad \text{[Equation 1]}$$

For instance, a MIMO communication system with four Tx antennas and four Rx antennas may achieve a four-fold increase in transmission rate theoretically, relative to a single-antenna wireless communication system. Since the theoretical capacity increase of the MIMO wireless communication system was proved in the mid 1990's, many techniques have been actively studied to increase data rate in real implementation. Some of the techniques have already been reflected in various wireless communication standards including standards for 3G mobile communications, future-generation Wireless Local Area Network (WLAN), etc.

Concerning the research trend of MIMO up to now, active studies are underway in many respects of MIMO, inclusive of studies of information theory related to calculation of multi-antenna communication capacity in diverse channel environments and multiple access environments, studies of measuring MIMO radio channels and MIMO modeling, studies of time-space signal processing techniques to increase transmission reliability and transmission rate, etc.

Communication in a MIMO system with NT Tx antennas and NR Rx antennas will be described in detail through mathematical modeling.

Regarding a transmission signal, up to NT pieces of information can be transmitted through the NT Tx antennas, as expressed as the following vector.

$$s = [s_1, s_2, \ldots, s_{N_T}]^T \quad \text{[Equation 2]}$$

A different transmission power may be applied to each piece of transmission information, $s_1, s_2, \ldots, s_{N_T}$. Let the transmit power levels of the transmission information be denoted by $P_1, P_2, \ldots, P_{N_T}$, respectively. Then the transmission power-controlled transmission information vector may be given as $$\hat{s} = [\hat{s}_1, \hat{s}_2, \ldots, \hat{s}_{N_T}]^T = [P_1 s_1, P_2 s_2, \ldots, P_{N_T} s_{N_T}]^T \quad \text{[Equation 3]}$$

The transmission power-controlled transmission information vector ŝ may be expressed as follows, using a diagonal matrix P of transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Equation 4]}$$

$N_T$ transmission signals $x_1, x_2, \ldots, x_{N_T}$ may be generated by multiplying the transmission power-controlled information vector ŝ by a weight matrix W. The weight matrix W functions to appropriately distribute the transmission information to the Tx antennas according to transmission channel states, etc. These $N_T$ transmission signals $x_1, x_2, \ldots, x_{N_T}$ are represented as a vector x, which may be determined as $$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \\ w_{i1} & w_{i2} & \cdots & w_{iN_T} \\ \vdots & & \ddots & \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = \quad \text{[Equation 5]}$$

$$W\hat{s} = WPs$$

Here, $w_{ij}$ denotes a weight between a jth piece of information and an ith Tx antenna and W is a precoding matrix.

The transmitted signal x may be differently processed using according to two schemes (for example, spatial diversity and spatial multiplexing). In spatial multiplexing, different signals are multiplexed and transmitted to a receiver such that elements of information vector(s) have different values. In spatial diversity, the same signal is repeatedly transmitted through a plurality of channel paths such that elements of information vector(s) have the same value. Spatial multiplexing and spatial diversity may be used in combination. For example, the same signal may be transmitted through three Tx antennas in spatial diversity, while the remaining signals may be transmitted to the receiver in spatial multiplexing.

Given NR Rx antennas, signals received at the Rx antennas, $y_1, y_2, \ldots, y_{N_R}$ may be represented as the following vector.

$$y=[y_1,y_2,\ldots,y_{N_R}]^T \quad \text{[Equation 6]}$$

When channels are modeled in the MIMO wireless communication system, they may be distinguished according to the indexes of Tx and Rx antennas. A channel between a jth Tx antenna and an ith Rx antenna is denoted by hij. Notably, the index of an Rx antenna precedes the index of a Tx antenna in hij.

FIG. 5(b) illustrates channels from NT Tx antennas to an ith Rx antenna. The channels may be collectively represented as a vector or a matrix. Referring to FIG. 5(b), the channels from the NT Tx antennas to the ith Rx antenna may be expressed as $$h_i^T=[h_{i1},h_{i2},\ldots,h_{iN_T}] \quad \text{[Equation 7]}$$

Hence, all channels from the $N_T$ Tx antennas to the $N_R$ Rx antennas may be expressed as the following matrix.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \ldots & h_{1N_T} \\ h_{21} & h_{22} & \ldots & h_{2N_T} \\ \vdots & & \ddots & \\ h_{i1} & h_{i2} & \ldots & h_{iN_T} \\ \vdots & & \ddots & \\ h_{N_R 1} & h_{N_R 2} & \ldots & h_{N_R N_T} \end{bmatrix} \quad \text{[Equation 8]}$$

Actual channels experience the above channel matrix H and then are added with Additive White Gaussian Noise (AWGN). The AWGN added to the NR Rx antennas is given as the following vector.

$$n=[n_1,n_2,\ldots,n_{N_R}]^T \quad \text{[Equation 9]}$$

From the above mathematical modeling, the received signal vector is given as $$y = \begin{bmatrix} y_1 \\ y_2 \\ \vdots \\ y_i \\ \vdots \\ y_{N_R} \end{bmatrix} = \begin{bmatrix} h_{11} & h_{12} & \ldots & h_{1N_T} \\ h_{21} & h_{22} & \ldots & h_{2N_T} \\ \vdots & & \ddots & \\ h_{i1} & h_{i2} & \ldots & h_{iN_T} \\ \vdots & & \ddots & \\ h_{N_R 1} & h_{N_R 2} & \ldots & h_{N_R N_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix} = \quad \text{[Equation 10]}$$

$$Hx + n$$

The numbers of rows and columns in the channel matrix H representing channel states are determined according to the numbers of Rx and Tx antennas. Specifically, the number of rows in the channel matrix H is equal to the number of Rx antennas, NR and the number of columns in the channel matrix H is equal to the number of Tx antennas, NT. Hence, the channel matrix H is of size NR×NT.

The rank of a matrix is defined as the smaller between the number of independent rows and the number of independent columns in the matrix. Accordingly, the rank of the matrix is not larger than the number of rows or columns of the matrix. The rank of the channel matrix H, rank(H) satisfies the following constraint.

$$\text{rank}(H) \leq \min(N_T,N_R) \quad \text{[Equation 11]}$$

In MIMO transmission, the term "rank" denotes the number of paths for independently transmitting signals, and the term "number of layers" denotes the number of signal streams transmitted through respective paths. In general, since a transmitter transmits as many layers as the number of ranks used for signal transmission, the rank has the same meaning as the number of layers unless otherwise noted.

Reference Signals (RSs)

In a wireless communication system, a packet is transmitted on a radio channel. In view of the nature of the radio channel, the packet may be distorted during the transmission. To receive the signal successfully, a receiver should compensate for the distortion of the received signal using channel information. Generally, to enable the receiver to acquire the channel information, a transmitter transmits a signal known to both the transmitter and the receiver and the receiver acquires knowledge of channel information based on the distortion of the signal received on the radio channel. This signal is called a pilot signal or an RS.

In case of data transmission and reception through multiple antennas, knowledge of channel states between Tx antennas and Rx antennas is required for successful signal reception. Accordingly, an RS should exist for each Tx antenna.

In a mobile communication system, RSs are largely categorized into two types according to the purposes that they serve, RSs used for acquisition of channel information and RSs used for data demodulation. The former-type RSs should be transmitted in a wideband to enable UEs to acquire downlink channel information. Even UEs that do not receive downlink data in a specific subframe should be able to receive such RSs and measure them. When an eNB transmits downlink data, it transmits the latter-type RSs in resources allocated to the downlink data. A UE can perform channel estimation by receiving the RSs and thus demodulate data based on the channel estimation. These RSs should be transmitted in a data transmission region.

In the legacy 3GPP LTE system (e.g. one conforming to 3GPP LTE Release-8), two types of downlink RSs are defined for unicast service, Common RS (CRS) and Dedicated RS (DRS). CRS is used for CSI acquisition and measurement, for example, for handover. The CRS is also called a cell-specific RS. DRS is used for data demodulation, called a UE-specific RS. The legacy 3GPP LTE system uses the DRS only for data demodulation and the CRS for the two purposes of channel information acquisition and data demodulation.

CRSs, which are cell-specific, are transmitted across a wideband in every subframe. According to the number of Tx antennas at an eNB, the eNB may transmit CRSs for up to four antenna ports. For instance, an eNB with two Tx antennas transmits CRSs for antenna port 0 and antenna port 1. If the eNB has four Tx antennas, it transmits CRSs for respective four Tx antenna ports, antenna port 0 to antenna port 3.

Figure 6:
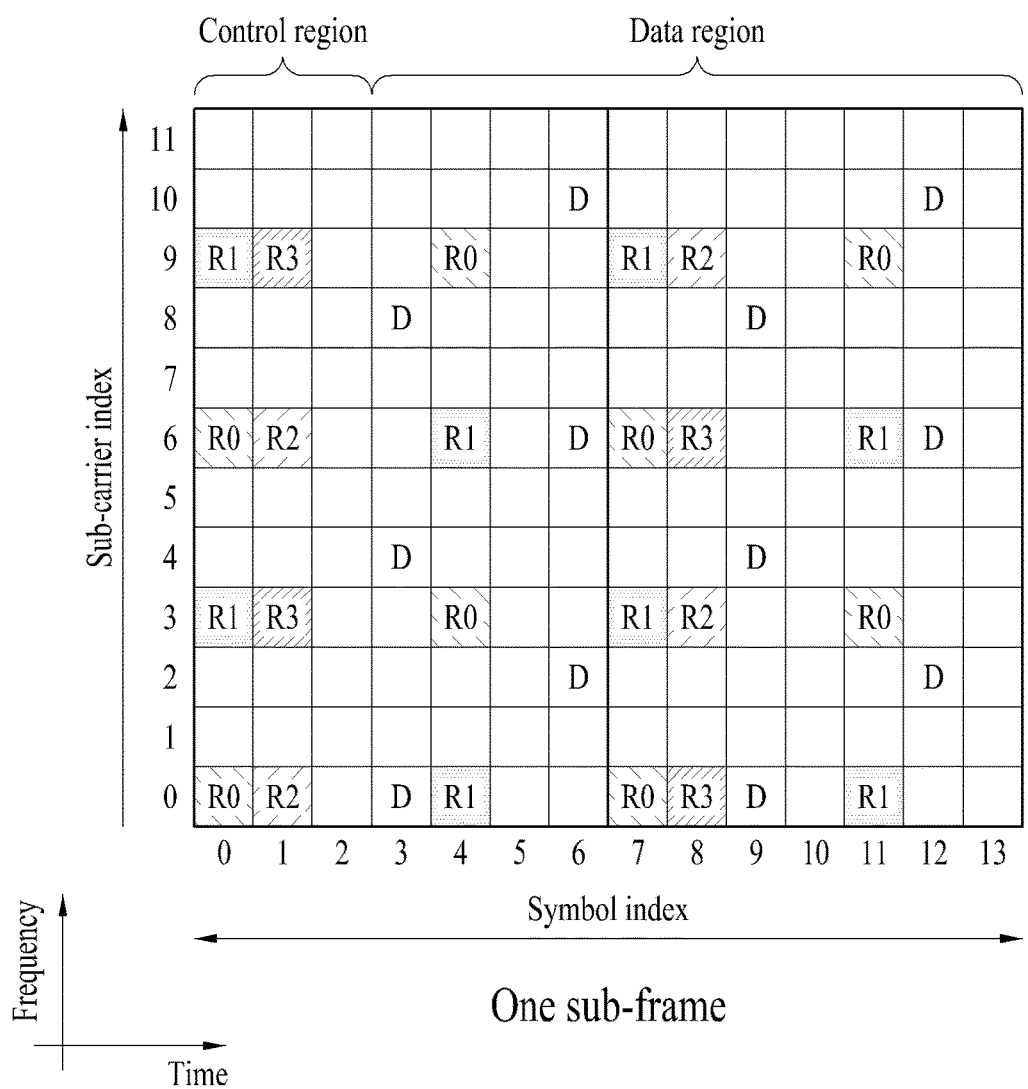
FIG. 6 is a diagram illustrating exemplary CRS and DRS patterns for one resource block.

FIG. 6 illustrates a CRS and DRS pattern for an RB (including 14 OFDM symbols in time by 12 subcarriers in frequency in case of a normal CP) in a system where an eNB has four Tx antennas. In FIG. 6, REs labeled with 'R0', 'R1', 'R2' and 'R3' represent the positions of CRSs for antenna port 0 to antenna port 4, respectively. REs labeled with 'D' represent the positions of DRSs defined in the LTE system.

The LTE-A system, an evolution of the LTE system, can support up to eight Tx antennas. Therefore, it should also support RSs for up to eight Tx antennas. Because downlink RSs are defined only for up to four Tx antennas in the LTE system, RSs should be additionally defined for five to eight Tx antenna ports, when an eNB has five to eight downlink Tx antennas in the LTE-A system. Both RSs for channel measurement and RSs for data demodulation should be considered for up to eight Tx antenna ports.

One of significant considerations for design of the LTE-A system is backward compatibility. Backward compatibility is a feature that guarantees a legacy LTE terminal to operate normally even in the LTE-A system. If RSs for up to eight Tx antenna ports are added to a time-frequency area in which CRSs defined by the LTE standard are transmitted across a total frequency band in every subframe, RS overhead becomes huge. Therefore, new RSs should be designed for up to eight antenna ports in such a manner that RS overhead is reduced.

Largely, new two types of RSs are introduced to the LTE-A system. One type is CSI-RS serving the purpose of channel measurement for selection of a transmission rank, a Modulation and Coding Scheme (MCS), a Precoding Matrix Index (PMI), etc. The other type is Demodulation RS (DM RS) for demodulation of data transmitted through up to eight Tx antennas.

Compared to the CRS used for both purposes of measurement such as channel measurement and measurement for handover and data demodulation in the legacy LTE system, the CSI-RS is designed mainly for channel estimation, although it may also be used for measurement for handover. Since CSI-RSs are transmitted only for the purpose of acquisition of channel information, they may not be transmitted in every subframe, unlike CRSs in the legacy LTE system. Accordingly, CSI-RSs may be configured so as to be transmitted intermittently (e.g. periodically) along the time axis, for reduction of CSI-RS overhead.

When data is transmitted in a downlink subframe, DM RSs are also transmitted dedicatedly to a UE for which the data transmission is scheduled. Thus, DM RSs dedicated to a particular UE may be designed such that they are transmitted only in a resource area scheduled for the particular UE, that is, only in a time-frequency area carrying data for the particular UE.

Figure 7:
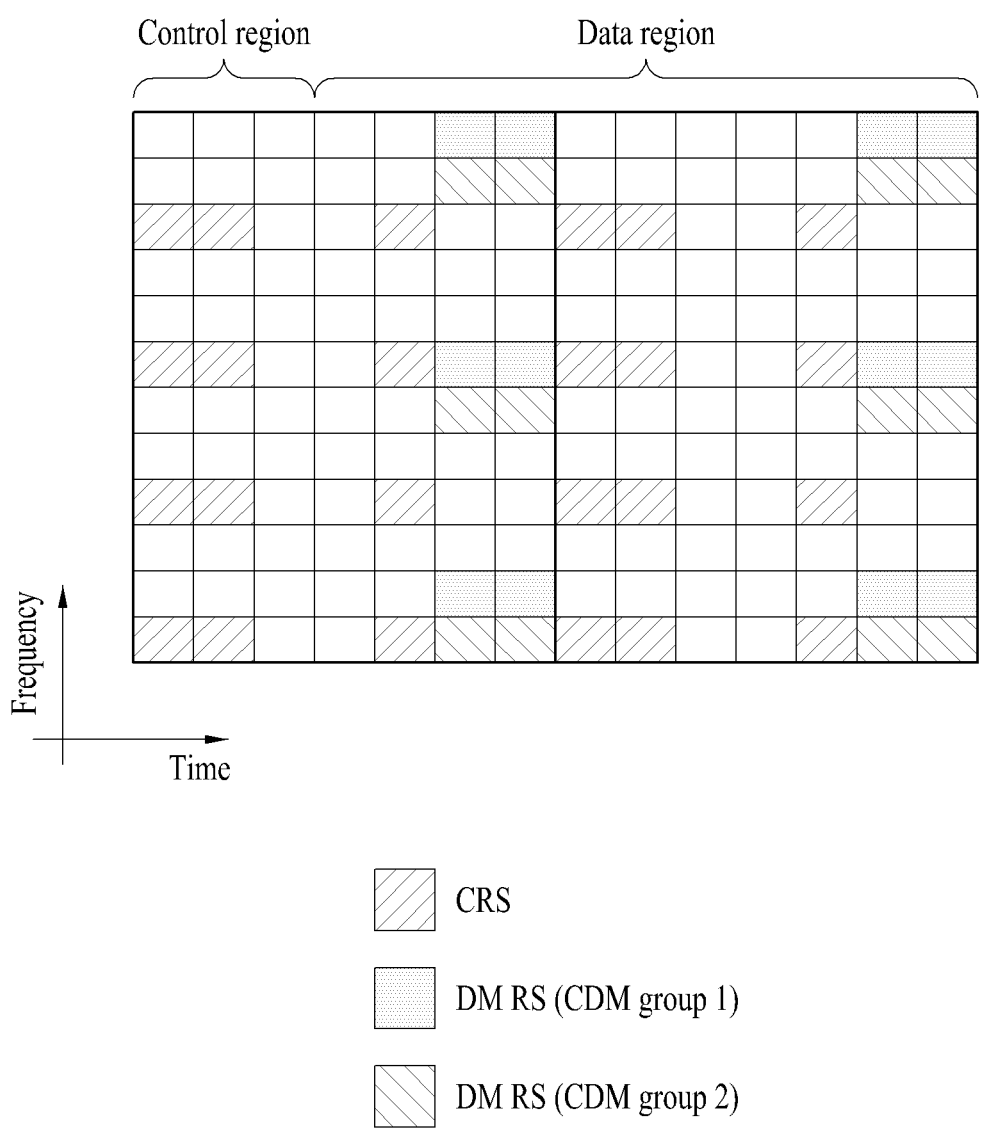
FIG. 7 is a diagram illustrating an example of a DM RS pattern defined in the LTE-A system.

FIG. 7 illustrates an exemplary DM RS pattern defined for the LTE-A system. In FIG. 7, the positions of REs carrying DM RSs in an RB carrying downlink data (an RB having 14 OFDM symbols in time by 12 subcarriers in frequency in case of a normal CP) are marked. DM RSs may be transmitted for additionally defined four antenna ports, antenna port 7 to antenna port 10 in the LTE-A system. DM RSs for different antenna ports may be identified by their different frequency resources (subcarriers) and/or different time resources (OFDM symbols). This means that the DM RSs may be multiplexed in Frequency Division Multiplexing (FDM) and/or Time Division Multiplexing (TDM). If DM RSs for different antenna ports are positioned in the same time-frequency resources, they may be identified by their different orthogonal codes. That is, these DM RSs may be multiplexed in Code Division Multiplexing (CDM). In the illustrated case of FIG. 7, DM RSs for antenna port 7 and antenna port 8 may be located on REs of DM RS CDM group 1 through multiplexing based on orthogonal codes. Similarly, DM RSs for antenna port 9 and antenna port 10 may be located on REs of DM RS CDM group 2 through multiplexing based on orthogonal codes.

Figure 8:
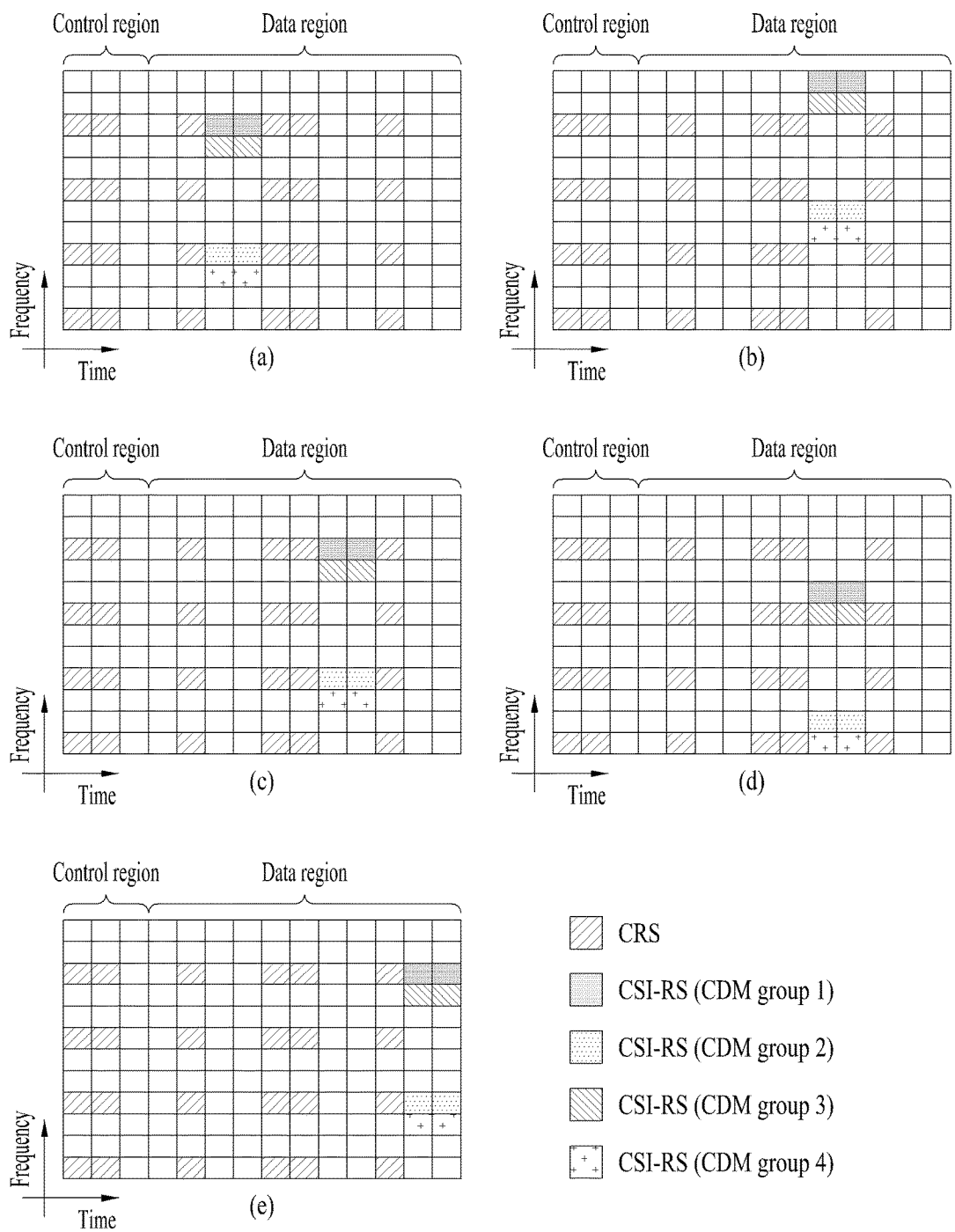
FIG. 8 is a diagram illustrating examples of CSI-RS patterns defined in the LTE-A system.

FIG. 8 illustrates exemplary CSI-RS patterns defined for the LTE-A system. In FIG. 8, the positions of REs carrying CSI-RSs in an RB carrying downlink data (an RB having 14 OFDM symbols in time by 12 subcarriers in frequency in case of a normal CP) are marked. One of the CSI-RS patterns illustrated in FIGS. 8(a) to 8(e) is available for any downlink subframe. CSI-RSs may be transmitted for eight antenna ports supported by the LTE-A system, antenna port 15 to antenna port 22. CSI-RSs for different antenna ports may be identified by their different frequency resources (subcarriers) and/or different time resources (OFDM symbols). This means that the CSI-RSs may be multiplexed in FDM and/or TDM. CSI-RSs positioned in the same time-frequency resources for different antenna ports may be identified by their different orthogonal codes. That is, these DM RSs may be multiplexed in CDM. In the illustrated case of FIG. 8(a), CSI-RSs for antenna port 15 and antenna port 16 may be located on REs of CSI-RS CDM group 1 through multiplexing based on orthogonal codes. CSI-RSs for antenna port 17 and antenna port 18 may be located on REs of CSI-RS CDM group 2 through multiplexing based on orthogonal codes. CSI-RSs for antenna port 19 and antenna port 20 may be located on REs of CSI-RS CDM group 3 through multiplexing based on orthogonal codes. CSI-RSs for antenna port 21 and antenna port 22 may be located on REs of CSI-RS CDM group 4 through multiplexing based on orthogonal codes. The same principle described with reference to FIG. 8(a) is applicable to the CSI-RS patterns illustrated in FIGS. 8(b) to 8(e).

Figure 9:
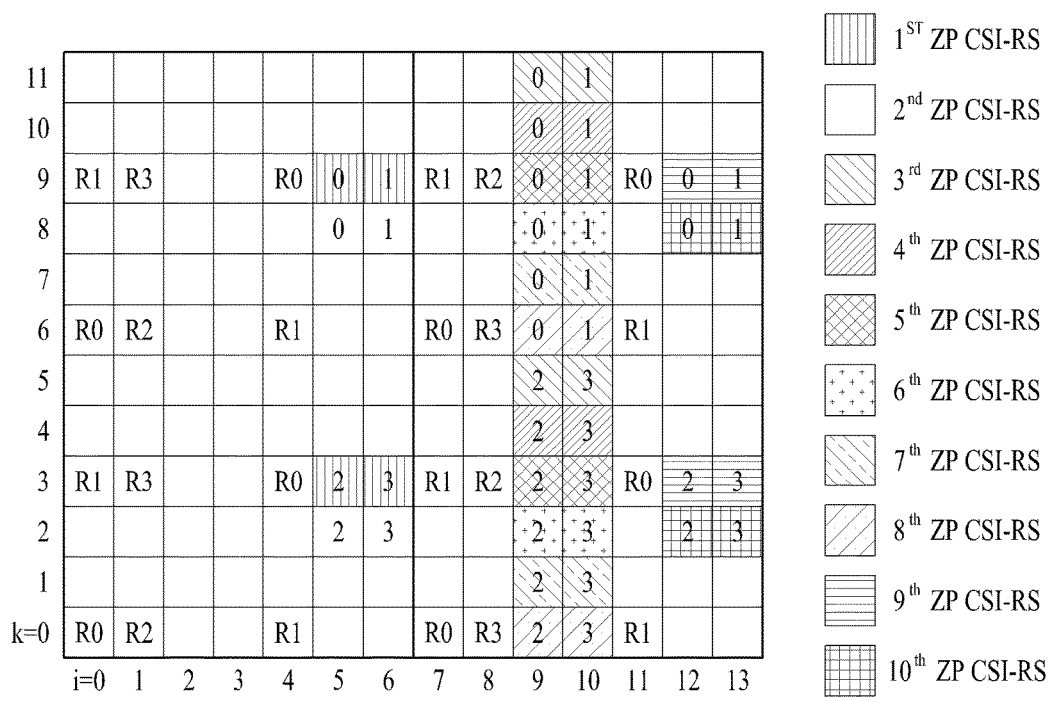
FIG. 9 is a diagram illustrating an example of Zero-Power (ZP) CSI-RS pattern defined in the LTE-A system.

FIG. 9 is a diagram illustrating an exemplary Zero-Power (ZP) CSI-RS pattern defined in an LTE-A system. A ZP CSI-RS is largely used for two purposes. First, the ZP CSI-RS is used to improve CSI-RS performance. That is, one network may mute a CSI-RS RE of another network in order to improve CSI-RS measurement performance of the other network and inform a UE thereof of the muted RE by setting the muted RE to a ZP CSI-RS so that the UE may correctly perform rate matching. Second, the ZP CSI-RS is used for interference measurement for CoMP CQI calculation. That is, some networks may mute a ZP CRS-RS RE and a UE may calculate a CoMP CQI by measuring interference from the ZP CSI-RS.

The RS patterns of FIGS. 6 to 9 are purely exemplary and an RS pattern applied to various embodiments of the present invention is not limited to such specific RS patterns. In other words, even when an RS pattern different from the RS patterns of FIGS. 6 to 9 is defined and used, various embodiments of the present invention may be identically applied.

Full Duplex Radio (FDR) Transmission

FDR refers to transmission and reception technology in which an eNB and/or a UE support transmission without separately performing uplink/downlink duplexing in frequency/time, etc.

Figure 10:
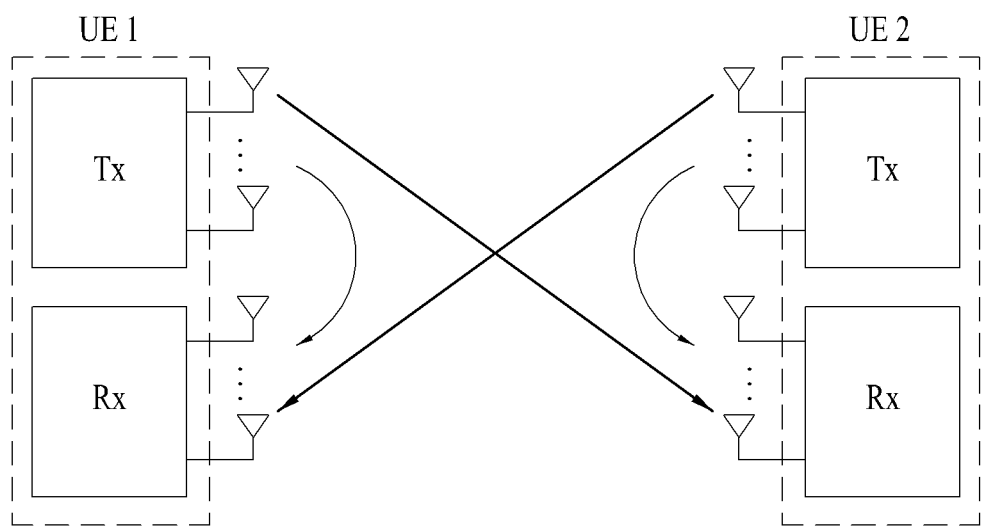
FIG. 10 is a diagram illustrating an example of an interference situation according to an FDR scheme.

FIG. 10 is a diagram illustrating an exemplary interference situation in an FDR scheme.

Referring to FIG. 10, UE 1 and UE 2 perform communication on uplink/downlink using the same frequency/time resource. Accordingly, each UE may perform transmission and simultaneously receive a signal from another eNB or UE. That is, as illustrated in dotted lines of FIG. 10, a communication environment in which a transmission signal of a device is received by a reception module (or a receiver) of the device to directly cause self-interference is formed.

When a multi-cell deployment environment is considered in a system, new interference or increased interference, which is expected due to introduction of FDR, is summarized as follows.

(1) Self-interference (Intra-device self-interference)

(2) Multi-user interference (UE to UE inter-link interference)

(3) Inter-cell interference (BS to BS inter-link interference)

Self-interference indicates that a signal transmitted from a device directly causes interference with respect to a receiver of the device as illustrated in FIG. Generally, a self-interference signal is received with a higher power than a desired signal. Therefore, it is important to perfectly cancel self-interference through an interference cancellation operation.

Second, multi-user interference refers to interference occurring between UEs. For example, multi-user interference indicates that a signal transmitted by a UE is received by an adjacently located UE, thereby acting as interference. In a legacy communication system, since a half-duplex mode (e.g., FDD or TDD) in which uplink or downlink transmission is separately performed in frequency or time is implemented, interference does not occur between uplink and downlink. However, an FDR transmission environment in which uplink and downlink share the same frequency/time resource causes interference between an eNB that transmits data and adjacent UEs as illustrated in FIG. 10.

Lastly, inter-cell interference represents interference occurring between eNBs. For example, inter-cell interference indicates that a signal transmitted by one eNB in a heterogeneous eNB situation is received by a reception antenna of another eNB, thereby acting as interference. This interference represents the same communication situation as multi-user interference and occurs by sharing uplink and downlink resources between eNBs. That is, although FDR can increase frequency efficiency by sharing the same time/frequency resources in uplink and downlink, increased interference may restrict frequency efficiency improvement.

Among the above three types of interference, (1) self-interference should be solved first for FDR operation due to affect of interference occurring only in FDR. FIG. 10 shows exemplary FDR in a self-interference situation. In more detail, a signal transmitted by one UE is received by a reception antenna of the same UE, thereby acting as interference.

Such self-interference has unique characteristics as opposed to other interference.

First, a signal acting as interference may be regarded as a perfectly known signal through wired connection in consideration of hardware implementation. However, although a signal received through an antenna is almost identical to a signal received through wired communication, they are not exactly the same due to nonlinearity of an RF device, channel variation between transmit and receive antennas related to interference signal transmission and reception, and the like. Thus, even though the signal acting as the interference is perfectly known, a receiving end cannot cancel the interference completely.

Figure 11:
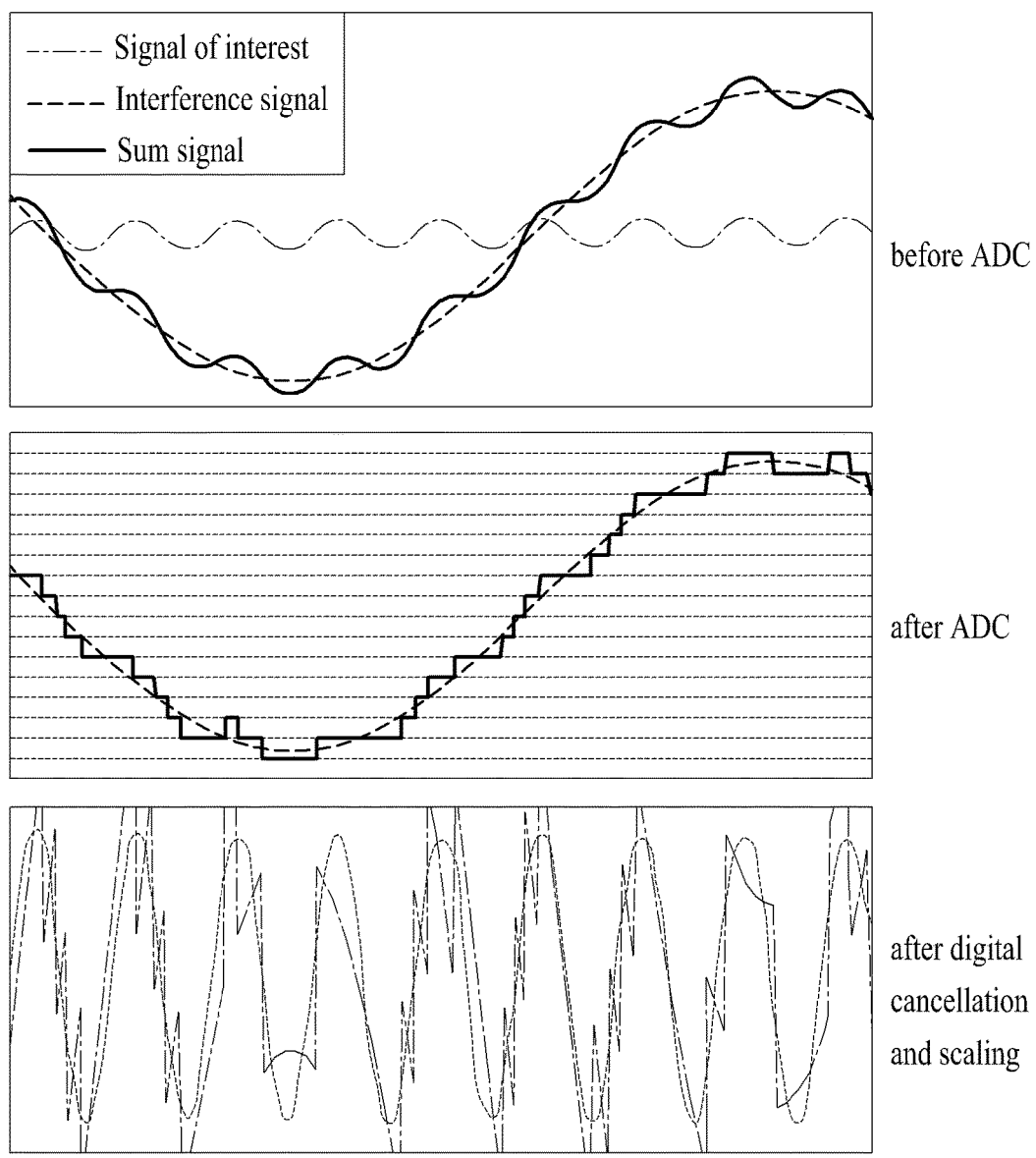
FIG. 11 is a diagram illustrating signal distortion caused when power of an interference signal is much higher than power of a desired signal.
Figure 12:
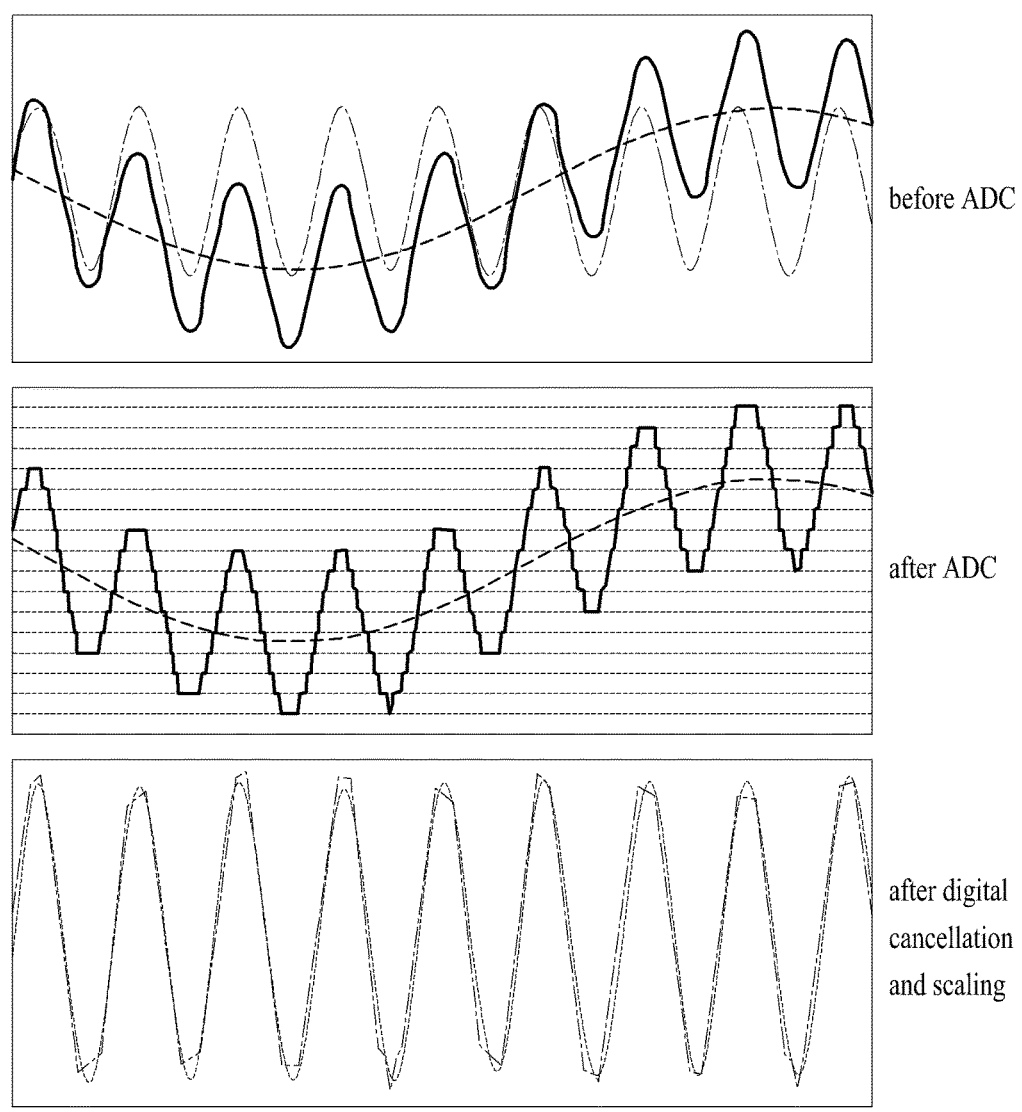
FIG. 12 is a diagram illustrating restoration of a desired signal through interference signal cancellation when power of the interference signal is lower than power of the desired signal.

Second, power of the signal acting as the interference is considerably higher than that of a desired signal. The receiving end uses an Analog-to-Digital Converter (ADC) to convert a received signal into a digital signal. Generally, the ADC measures power of a received signal to adjust a power level of the received signal, quantizes the power-adjusted received signal, and converts the quantized signal into a digital signal. However, if power of the interference signal is remarkably higher than that of the desired signal, characteristics of the desired signal are covered by a quantization level during quantization and thus the received signal may not be restored. FIG. 11 is a diagram illustrating distortion of a desired signal even after cancellation of an interference signal when quantization is performed in a situation in which power of the interference signal is much higher than that of the desired signal. FIG. 12 is a diagram illustrating restoration of a desired signal through interference signal cancellation when power of the interference signal is lower than power of the desired signal.

As can be seen from FIGS. 11 and 12, when self-interference is properly cancelled, the desired signal may be correctly received. A method for cancelling self-interference can be classified into four types according to a position in which self-interference cancellation is performed.

Figure 13:
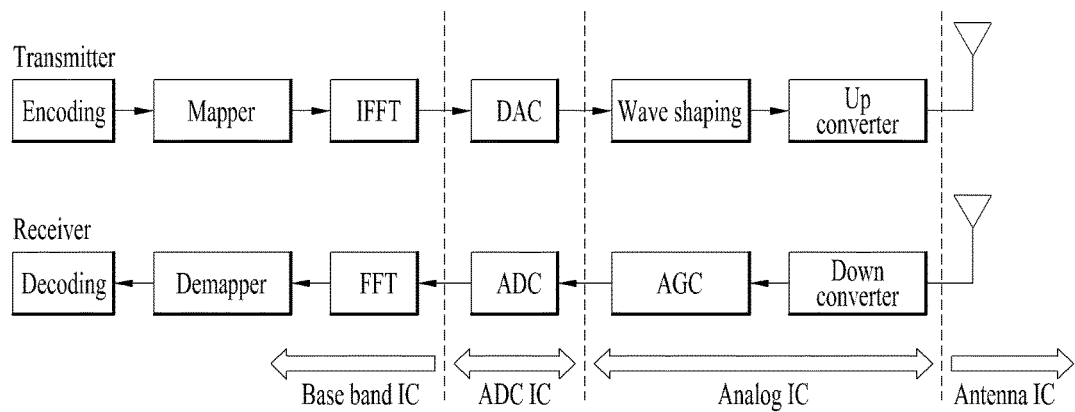
FIG. 13 is a block diagram illustrating positions in which self-interference cancellation (IC) is performed.

FIG. 13 is a block diagram illustrating positions in which self-interference cancellation (IC) is performed.

First of all, an antenna IC method is described.

Figure 14:
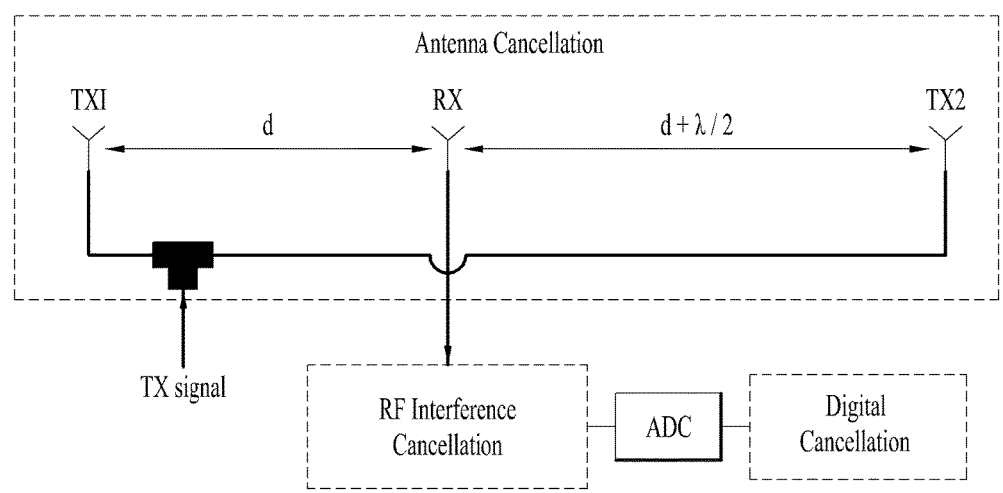
FIG. 14 illustrates an example of an antenna IC method.

As the simplest one among all the IC methods, the antenna IC method can be implemented as shown in FIG. 14 to perform antenna IC.

A single UE may use three antennas to perform the interference cancellation. Among the three antennas, two antennas are used as a TX antenna and one antenna is used as an RX antenna. The two TX antennas are installed apart from each other by a distance of about half-wavelength with reference to the RX antenna. Thus, when signals transmitted from the TX antennas are received at the RX antenna, the RX antenna can observe that the signals have the opposite phases. Accordingly, among signals received by the RX antenna, interference signals converge to zero.

Figure 15:
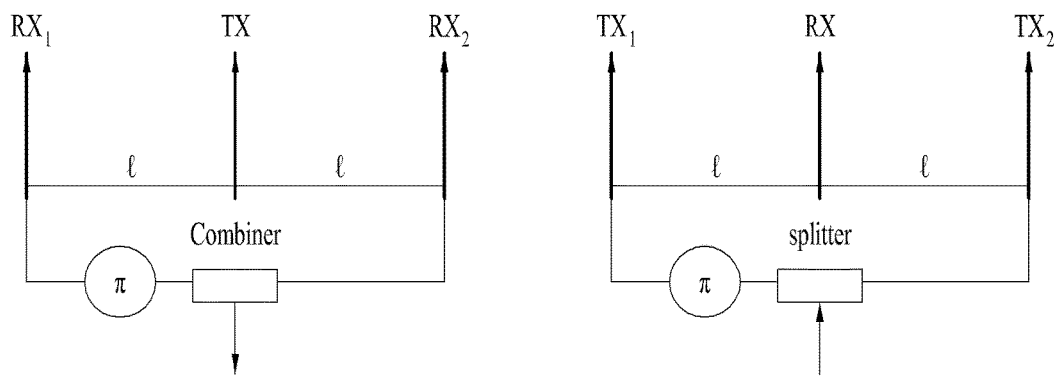
FIG. 15 illustrates an example of an IC method of using a phase shifter.

Alternatively, instead of using the distance between the antennas as shown in FIG. 14, a phase shifter of FIG. 15 may be used to invert a phase of the signal transmitted from the second TX antenna, whereby the interference signals can be cancelled.

In FIG. 15, the left drawing illustrates a method for performing interference cancellation using two RX antennas and the right drawing illustrates a method for performing interference cancellation using two TX antennas.

Figure 16:
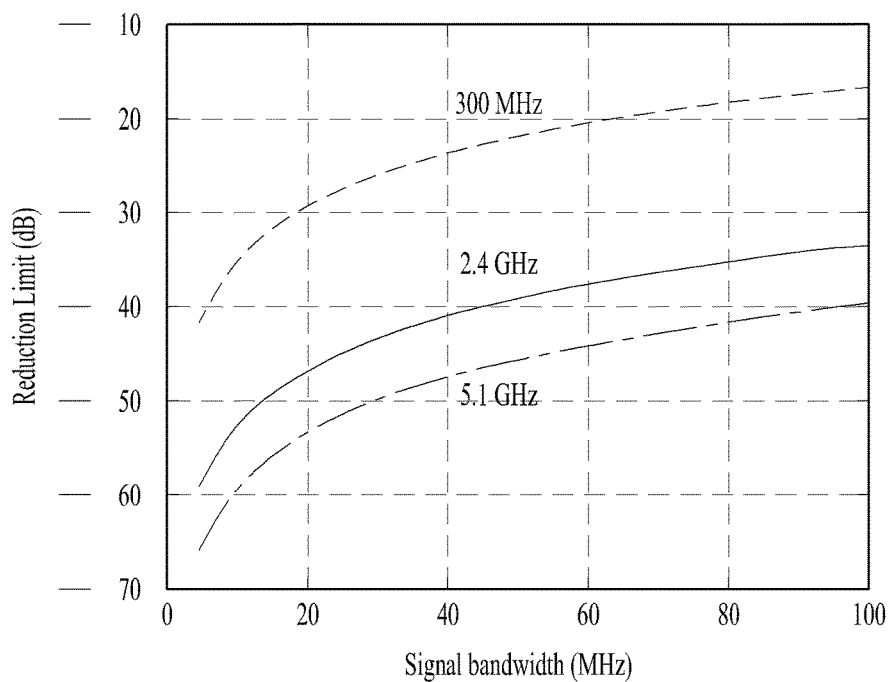
FIG. 16 is a graph showing different IC performance depending on a bandwidth and a center frequency of a signal.

Such an antenna IC method is affected by a bandwidth and a center frequency of a transmitted signal. That is, as the bandwidth of the transmitted signal becomes narrower and the center frequency of the transmitted signal becomes higher, IC performance is enhanced. FIG. 16 shows different IC performance depending on a bandwidth and a center frequency of a signal.

Secondly, an analog-digital converter (ADC) IC method is described.

The main reason that interference is not cancelled although an interference signal is well known is loss occurring during an ADC process. That is, according to the ADC IC method, interference can be easily cancelled by maximizing ADC performance.

Although the ADC IC method has a disadvantage in that the method is difficult to be implemented due to quantization bit restriction of ADC, interference cancellation efficiency according to the method can be enhanced as the ADC performance is improved.

Thirdly, an analog IC method is described.

According to the analog IC method, the interference cancellation is performed before the ADC and, more particularly, self-interference is cancelled using an analog signal. The analog IC method may be performed in a radio frequency (RF) domain or an intermediate frequency (IF) domain. As the simplest analog IC method, phase and time of a transmitted analog signal is delayed and then delayed phase and time is subtracted from a signal received through an RX antenna.

Compared to the antenna IC method, the analog IC method has the following advantage: the number of TX antennas and the number of RX antennas are one, respectively.

However, the analog IC method also has disadvantages as follows. The implementation is complicated since the analog signal is used. Moreover, additional distortion may occur due to circuit characteristics.

Finally, a digital IC method is described.

According to the digital IC method, interference cancellation is performed after the ADC and the method include all the IC methods performed in a base band domain. As the simplest digital IC method, a transmitted digital signal is subtracted from a received digital signal. Alternatively, in case of a UE or an eNB that performs transmission using multiple antennas, the UE or the eNB may use beamforming or precoding to prevent a transmitted signal from being received at an RX antenna. Moreover, if such methods are performed in the base band domain, they may be considered as the digital IC method.

However, the digital IC method also has the following disadvantages. That is, to perform the digital IC, signal power difference between an interference signal and a desired signal should be within an ADC range after cancelling interference according to at least one of the above-described methods since a digitized signal needs to be quantized enough to restore information with respect to the desired signal.

Figure 17:
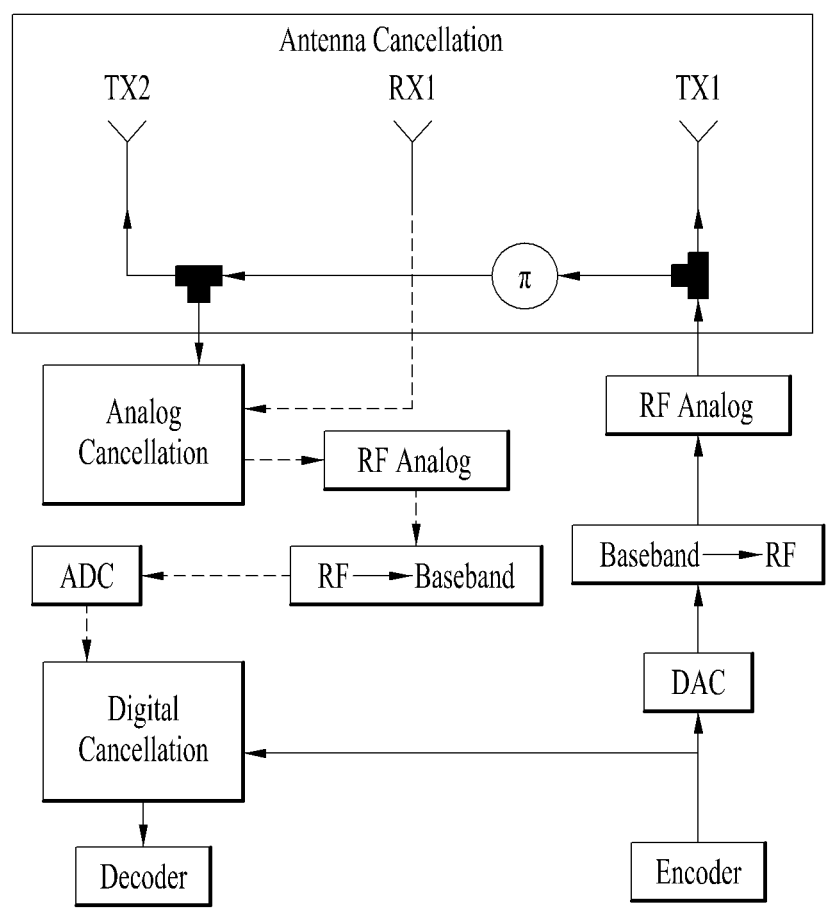
FIG. 17 illustrates a system to which multiple IC methods are applied simultaneously.

FIG. 17 illustrates a system to which the above-mentioned four IC methods are applied simultaneously. In FIG. 17, overall IC performance is determined by combining the four IC methods performed in the corresponding domains.

Based on the antenna IC method that can be implemented most simply among the above methods, a frame structure and a method capable of cancelling self-interference and improving entire cell throughput will be explained in the following description. It is apparent that the present invention can be applied to a case in which not only the antenna IC method but also the remaining methods are applied together.

Frame Structure

Figure 18:
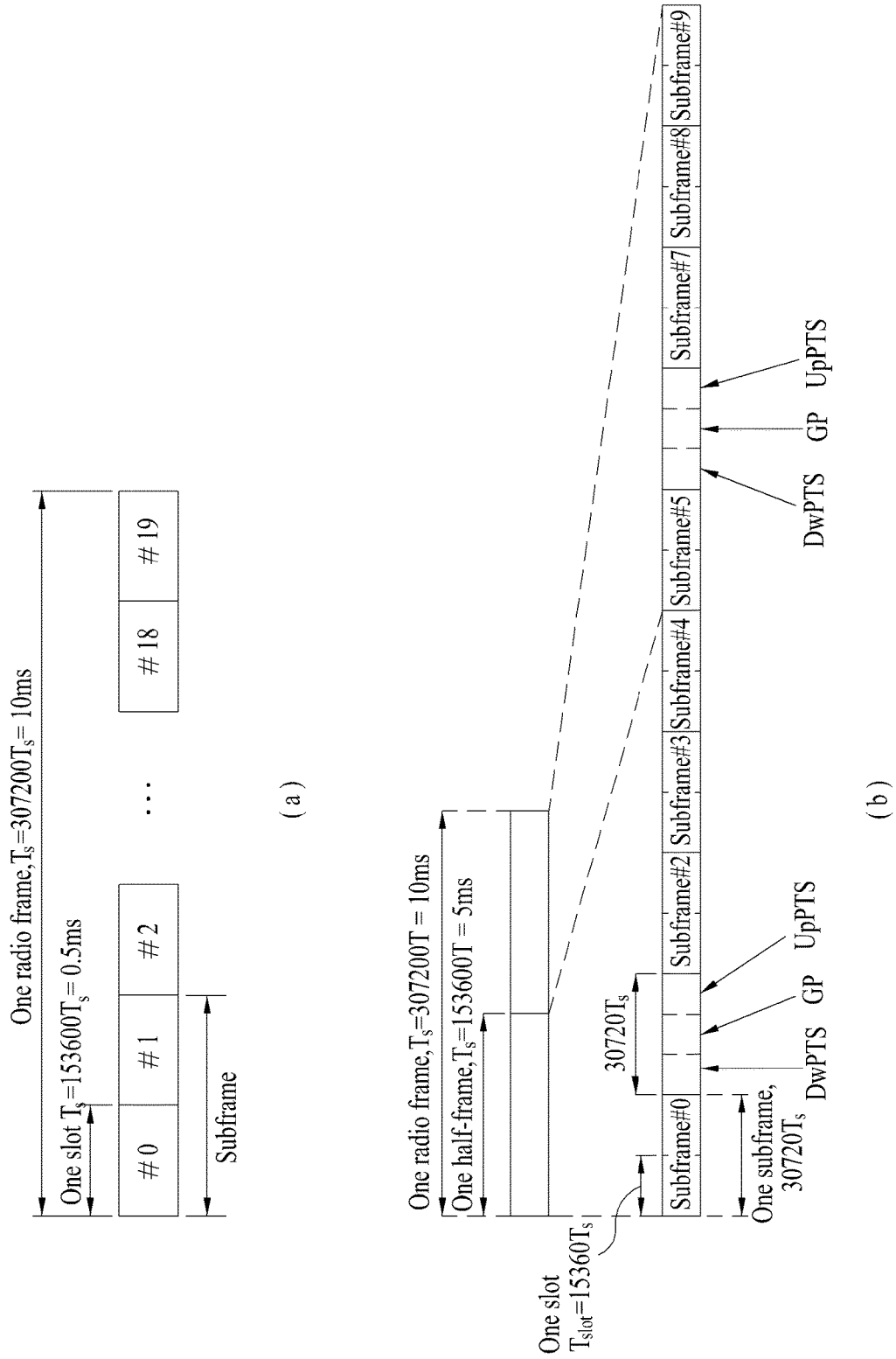
FIG. 18 illustrates a radio frame structure in 3GPP LTE.

FIG. 18 illustrates a radio frame structure in 3GPP LTE.

FIG. 18 (a) illustrates frame structure type 1. The frame structure type 1 is applicable to both a full Frequency division duplex (FDD) system and a half FDD system.

One radio frame has a length of 10 ms (i.e., $T_f=307200 \cdot T_s$), including equal-sized 20 slots indexed from 0 to 19. Each slot has a length of 0.5 ms (i.e., $T_{slot}=15360 \cdot T_s$). One subframe is defined as two consecutive slots. An $i^{th}$ subframe is configured with $(2i)^{th}$ and $(2i+1)^{th}$ slots. That is, a radio frame includes 10 subframes. A time required for transmitting one subframe is defined as a transmission time interval (TTI). $T_s$ is a sampling time given as $T_s=1/(15 \text{ kHz} \times 2048)=3.2552 \times 10^{-8}$ (i.e., about 33 ns). One slot includes a plurality of orthogonal frequency division multiplexing (OFDM) symbols or SC-FDMA symbols in the time domain and a plurality of Resource Blocks (RBs) in the frequency domain.

One slot includes a plurality of OFDM symbols in the time domain. Since OFDMA is adopted for DL in the 3GPP LTE system, one OFDM symbol represents one symbol period. In other words, an OFDM symbol may be referred to as an SC-FDMA symbol or a symbol period. A resource block (RB) is a resource allocation unit including a plurality of consecutive subcarriers in one slot.

In the full FDD system, 10 subframes may be used simultaneously for DL transmission and UL transmission every 10 ms duration. In the frequency domain, the DL transmission and the UL transmission are distinguished with each other. On the other hand, a UE cannot perform transmission and reception simultaneously in the half FDD system.

The number of OFDM symbols included in one slot may be varied depending on configuration of CP (cyclic prefix). Examples of the CP include extended CP and normal CP. For example, if the OFDM symbol is configured with normal CP, the number of OFDM symbols included in one slot may be 7. If the OFDM symbol is configured with extended CP, since the length of one OFDM symbol is increased, the number of OFDM symbols included in one slot is smaller than that of OFDM symbols in the case of normal CP. In the case of the extended CP, the number of OFDM symbols included in one slot may be 6. If a channel status is unstable like the case where the user equipment moves at high speed, the extended CP may be used to reduce inter-symbol interference.

If the normal CP is used, since one slot includes seven OFDM symbols, one subframe includes 14 OFDM symbols. At this time, first two or three OFDM symbols of each subframe may be allocated to a physical downlink control channel (PDCCH) and the other OFDM symbols may be allocated to a physical downlink shared channel (PDSCH).

The aforementioned structure of the radio frame is only exemplary and various modifications may be made in the number of subframes included in the radio frame, the number of slots included in the subframe, or the number of symbols included in the slot.

FIG. 2(b) illustrates frame structure type 2. The frame structure type 2 is applied to a time division duplex (TDD) system. One radio frame has a length of 10 ms (i.e., $T_f=307200 \cdot T_s$), including two half-frames each having a length of 5 ms (i.e., $153600 \cdot T_s$). Each half-frame includes five subframes each having a length of 1 ms (i.e., $30720 \cdot T_s$). An $i^{th}$ subframe includes $(2i)^{th}$ and $(2i+1)^{th}$ slots each having a length of 0.5 ms (i.e., $T_{slot}=15360 \cdot T_s$) where $T_s$ is a sampling time given as $T_s=1/(15 \text{ kHz} \times 2048)=3.2552 \times 10^{-8}$ (i.e., about 33 ns).

A type-2 frame includes a special subframe having three fields of downlink pilot time slot (DwPTS), guard period (GP), and uplink pilot time slot (UpPTS). The DwPTS is used for initial cell search, synchronization, or channel estimation at a UE and the UpPTS is used for channel estimation and UL transmission synchronization with a UE at an eNB. The GP is used to cancel UL interference between UL and DL, caused by the multi-path delay of a DL signal.

Table 1 below shows special subframe configurations (DwPTS/GP/UpPTS lengths)

TABLE 1

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | — | — | — |
| 8 | $24144 \cdot T_s$ | | | — | — | — |

FIG. 19 illustrates examples of frame configurations according to the radio frame structure of FIG. 18 (b).

In FIG. 19, 'D' represents a subframe for DL transmission, 'U' represents a subframe for UL transmission, and 'S' represents a special subframe for a guard time.

All UEs in each cell have one common frame configuration among the configurations shown in FIG. 18. That is, since a frame configuration is changed depending on a cell, the frame configuration may be referred to as a cell-specific configuration.

In the case of TDD, a UL/DL configuration is fixed in a cell as described above and thus DL or UL traffic required by a UE is difficult to be reflected in a UE-specific manner.

To overcome the above problem, the present invention proposes a method for configuring a UL/DL configuration in a UE-specific manner. In other words, in a single cell, each UE may have a different UL/DL configuration and required traffic may also reflected dynamically or semi-statically, whereby the cell efficiency can be improved.

Figure 20:
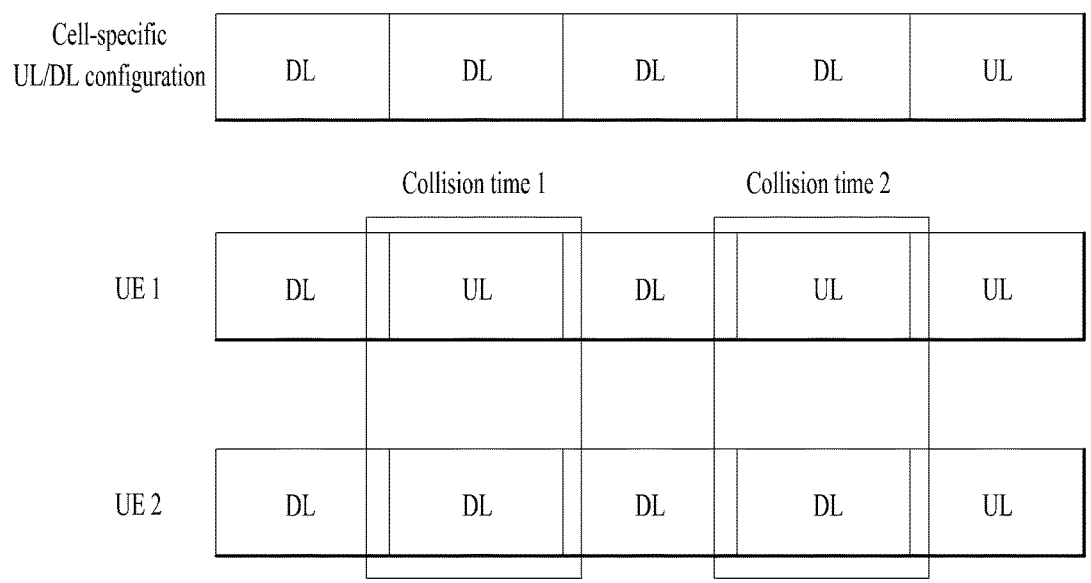
FIG. 20 illustrates an example of resource allocation in UE-specific TDD.

FIG. 20 illustrates a case in which when a cell-specific UL/DL configuration is predetermined, UE 1 transmits UL subframes during times reserved for DL subframe transmission due to additionally required UL traffic. In this case, two collisions occur as shown in FIG. 20 and an eNB may have a problem in receiving a UL signal transmitted from the UE 1. To solve this, the eNB needs to be able to cancel self-interference and operate in full duplex mode. To support the above-mentioned UE-specific TDD, the present invention assumes that an eNB can cancel self-interference and operate in a full duplex mode.

Figure 21:
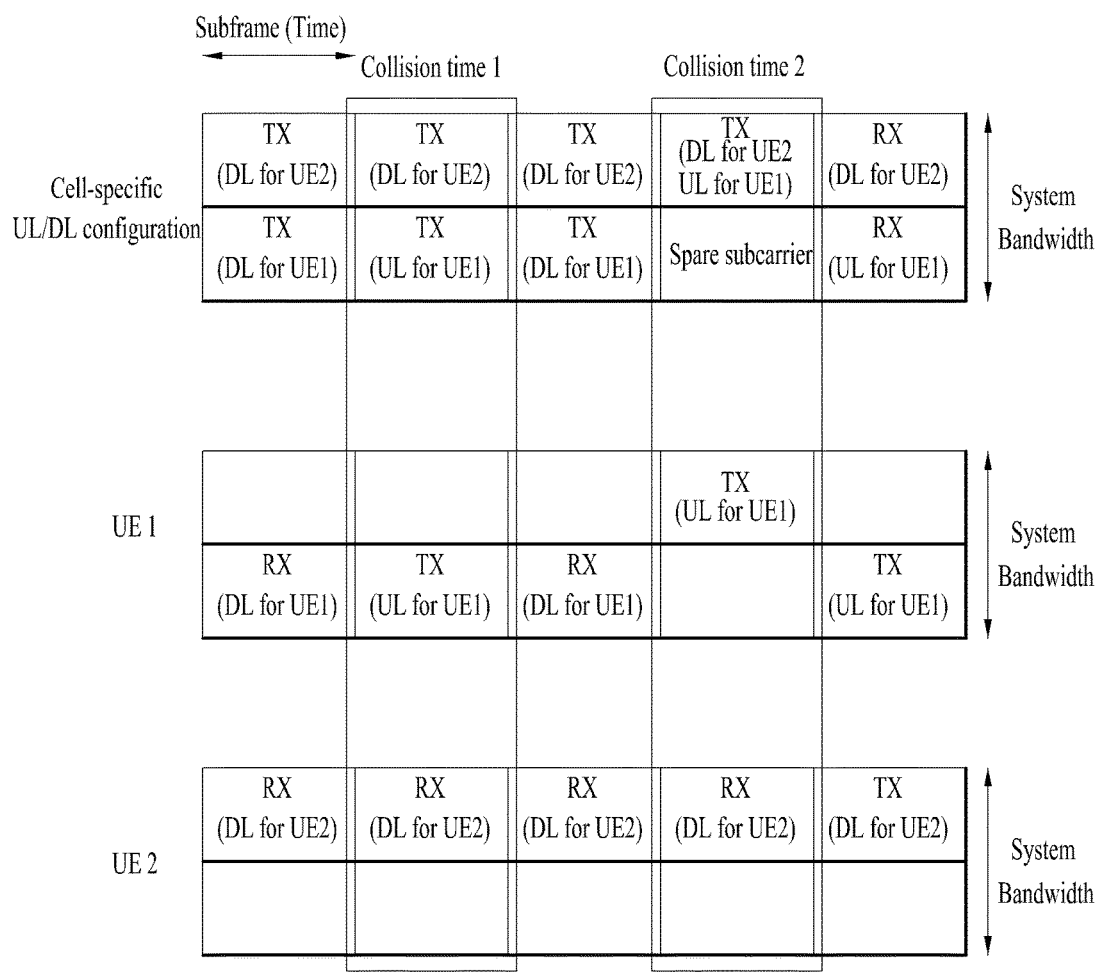
FIG. 21 illustrates an example of resource allocation in UE-specific TDD.

Details will be described with reference to FIG. 21. If there are two UEs in one cell and multiple accesses of the UEs are performed based on FDMA/OFDMA, resources may be allocated as shown in FIG. 21.

In this case, since a UL signal transmitted by UE 1 and a DL signal received by UE 2 do not overlap with each other in the frequency domain, the self-interference may not occur in the eNB during collision time 1 ideally. However, in actual implementation, cut-off characteristics of a filter is not very sharp and thus it causes adjacent interference, whereby the self-interference may occur in the eNB. In addition, the self-interference obviously occurs in the eNB during collision time 2. As mentioned in the foregoing description, the present invention assumes that the eNB can cancel the self-interference and operate in the full duplex mode to support the UE-specific TDD.

To this end, the eNB needs to transmit to a UE information indicating whether the UE-specific TDD is applied or not. The information may be transmitted through higher layer signaling and it can be represented as one or more bits.

After receiving the information indicating the UE-specific TDD is applied, the UE operates by assuming that it may operate in accordance with a configuration different from the conventional cell-specific UL/DL configuration. Particularly, the UE needs to perform BD (blind detection) on DCI based on the assumption that at least one scheduling grant may appear in a specific subframe and a grant message may be transmitted even in a subframe in which the grant message is not transmitted usually.

Alternatively, the eNB may include an additional UL/DL configuration in information to be transmitted to the UE. The additional UL/DL configuration may be transmitted in the form of a bitmap. Moreover, the eNB may transmit the additional UL/DL configuration using bits smaller than that of a full bitmap in a manner of setting a restriction on some configurations. For instance, when a Downlink-to-Uplink Switch-point periodicity of a new UL/DL configuration is 5 ms, it can be represented using 5 bits. And, when the Downlink-to-Uplink Switch-point periodicity is 10 ms, it can be set to 10 bits.

When the Downlink-to-Uplink Switch-point periodicity is 10 ms, a restriction may be set based on the fact that round trip gap (RTG) and transition time gap (TTG) are definitely necessary for switching from DL to UL. On the other hand, based on the assumption that the special subframe is obviously necessary since the special subframe is designed in consideration of the RTG and TTG and a radio frame starts with a DL subframe, two subframe may be fixed. Thus, the UL/DL configuration information may be transmitted to the UE through only 8-bits of a bitmap. Assuming that '1' indicates a DL subframe and '0' indicates a UL subframe in the 8-bits of the bitmap, when '00001111' is transmitted, the UL/DL configuration may be transmitted as shown in FIG. 22. In this case, it is apparent that '0' may indicate the DL subframe and '1' may indicate the UL subframe.

As an additional restriction, to minimize the number of times of Downlink-to-Uplink Switch, it can be assumed that the same type of links are continuously arranged and a UL subframe is preferentially arranged in the back of the special subframe. That is, the number of UL subframes in a UL/DL configuration period may be informed to the UE for the purpose of indicating the UL/DL configuration.

For instance, based on the assumption that among 10 subframes, a first subframe and a second subframe are fixed to the DL subframe and the special subframe, respectively, the number of consecutive UL subframe among the remaining 8 subframes may be informed. Thus, the number of the consecutive UL subframes may be indicated through maximum 3 bits. For instance, if '010' is indicated, a UL/DL configuration may be set as shown in FIG. 23.

If a period of the UL/DL configuration is 5 ms, indication may be transmitted using maximum 2 bits. For instance, if '11' is indicated, a UL/DL configuration may be set as shown in FIG. 24.

Meanwhile, although the UL/DL configuration may be transmitted through higher layer signaling as described above, a scheduling grant, which is transmitted through a downlink control channel, may be utilized to indicate the UL/DL configuration. In addition, the scheduling grant based method is advantageous in that instant adaptation to traffic load can be instantly performed since it is operated without a UL/DL configuration period. Moreover, a signaling method such as UE-specific TDD enabling may be performed together with the scheduling grant based transmission method.

In the scheduling grant based transmission method for the UE-specific TDD operation, transmission is performed based on a DCI format transmitted through PDCCH. On the other hand, in the conventional cell-specific TDD system, transmission is performed in a manner that a DCI format for scheduling the DL subframe (PDSCH) is transmitted in a DL subframe for transmitting the corresponding PDSCH and a location in which a DCI format for scheduling the UL subframe (PUSCH) is fixed to a specific subframe. That is, a UE detects the DCI format for scheduling one PDSCH and the DCI format for scheduling one PUSCH from the corresponding PDCCH.

However, to operate the UE-specific TDD, a plurality of DCI formats for scheduling a subframe in one PDCCH need to be transmitted. Thus, even in case that a UE detects a DL or UL DCI format masked with C-RNTI of the corresponding UE by sequentially performing BD (blind decoding), the UE should be able to detect the DCI formats for scheduling a plurality of DL or UL subframes by continuously performing the BD. Accordingly, a new DCI format and a related operating method are required to operate the UE-specific TDD and details will be described in the following.

FIG. 25 illustrates an existing UL/DL configuration with a ratio of DL subframes to UL subframes set to 1:1. Referring to FIG. 25, except special subframes, the number of DL subframes is four and the number of UL subframes is also four.

Moreover, a PDCCH transmission time for transmitting 4 PUSCHs may be configured as shown in FIG. 26. Referring to FIG. 26, two DL subframes, subframes #4 and #9 and two special subframes, subframes #1 and #6 are used for transmission.

According to the present invention, TDD UL/DL configuration 1 in which UL and DL subframes are equally distributed is determined as a cell-specific UL/DL configuration (i.e., reference UL/DL configuration) and UE-specific UL/DL configurations may be determined for UEs with reference to the TDD UL/DL configuration 1 whereby, UL to DL switching and DL to UL switching can be easily performed.

In the above example, both a DL DCI format and a UL DCI format may be transmitted in subframe #1. A UL grant of PDCCH transmitted in a special subframe schedules UL subframe #7 appearing after 6 subframes. In this case, if a UE recognizes the UL DCI format as the DL DCI format, subframe #7 can be utilized as a DL subframe for the corresponding UE instead of the UL subframe. Moreover, the UL DCI format to be transmitted in subframe #4 is switched to the DL DCI format and then the switched DL DCI format is transmitted in subframe #4. If a UE recognizes the above switching, the UE may receive UL subframe #8 as the DL subframe.

On the contrary, if specific bits are added such that a UE schedules DL subframes #0, #4, #5, and #9 as UL subframes by recognizing the DL DCI format transmitted in the corresponding subframes as the UL DCI format, the UE may obtain a UL grant for PUSCH transmission. However, in this case, there may be a restriction. That is, there should be one or more DL subframes for receiving the UL grant transmitted through the PDCCH. Moreover, a location for transmitting the UL grant should be set to a DL subframe before 4 ms in consideration of UE's processing time. For instance, to transmit PUSCH by using DL subframe #9 as the UL subframe, a location for transmitting the UL grant may be set to DL subframe #5. In this case, although all DL subframes before 4 ms are available, the closet DL subframe among DL subframes before 4 ms is considered as the most suitable location.

Before configuring the DCI format as described above, 1 bit of indication information needs to be included in the DCI format to indicate whether its purpose is to schedule the DL subframe or the UL subframe.

For instance, when the indication information is set to 0, it may indicate the UL grant. And, when the indication information is set to 1, it may indicate the DL grant. On the contrary, when the indication information is set to 1, it may indicate the UL grant. And, when the indication information is set to 0, it may indicate the DL grant.

Moreover, when the above-mentioned TDD UL/DL configuration 1 is not used as the cell-specific configuration or the number of DL subframes is smaller than the number of UL subframes, a plurality of DCI formats are transmitted in one PDCCH and a location of a subframe indicated by corresponding DCI should be informed to indicate a location of each subframe. To this end, when the configuration period is 5 ms, maximum 3 bits of information is required. And, when the configuration period is 10 ms, maximum 4 bits of information is required.

In this case, a location of a subframe indicated by the corresponding bits means that the DCI format is received in an $n^{th}$ subframe. When the period is 10 ms, it may be represented as shown in FIG. 27.

If information on the location of the subframe and Flag for DL/UL grant differentiation is transmitted as described above, a size of the DCI format may be changed. Moreover, if it is transmitted through a common search space, the number of times of BD may be increased. Thus, when the above-described UE-specific TDD is activated through higher layer signaling, it is preferred to transmit DCI for scheduling PDSCH and PUSCH through a UE-specific search space.

That is, information for supporting the UE-specific TDD may be added to the DCI format corresponding to a transmission mode and the DCI format may be transmitted to the UE through the UE-specific search space. In this case, transmission of DCI formats 0 and 1A through the common search space can be maintained for the conventional existing transmission fallback operation. In addition, the UE may implicitly know that a detected DCI format corresponds to the grant which is based on the cell-specific TDD configuration.

Figure 28:
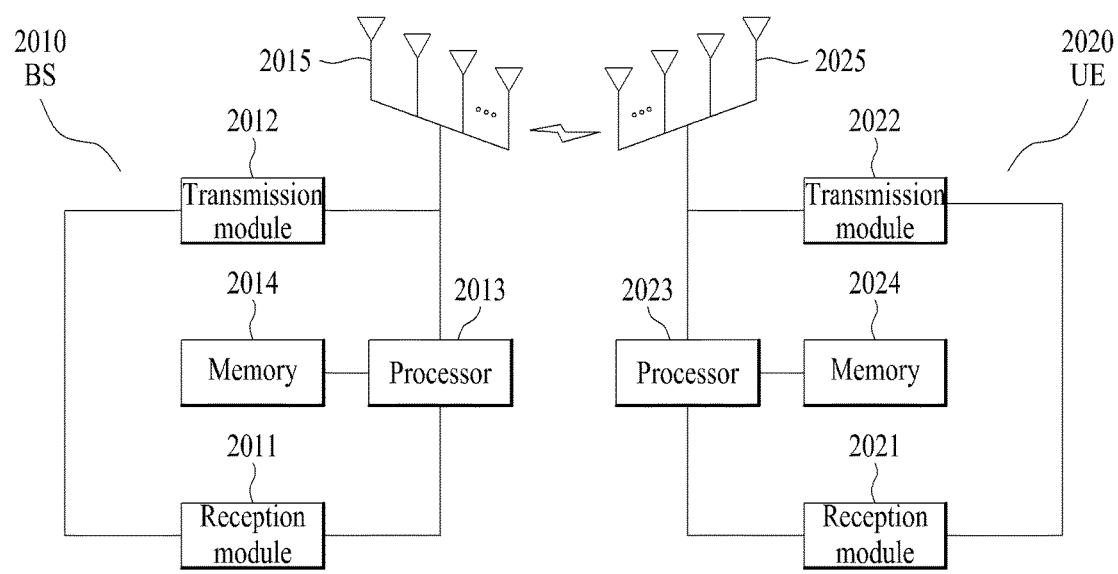
FIG. 28 illustrates an eNB and a UE applicable to an embodiment of the present invention.

FIG. 28 illustrates an eNB and a UE applicable to an embodiment of the present invention.

If a relay node is included in a wireless communication system, a communication in backhaul link is performed between a base station and the relay node and a communication in access link is performed between the relay node and a user equipment. Therefore, the base station or user equipment shown in the drawing can be substituted with the relay node in some cases.

Referring to FIG. 28, a wireless communication system includes an eNB 2010 and a UE 2020. The eNB 2010 includes a processor 2013, a memory 2014 and an RF (radio frequency) unit 2011 and 2012. The processor 2013 can be configured to implement the procedures and/or methods proposed by the present invention. The memory 2014 is connected to the processor 2013 and stores various kinds of informations related to operations of the processor 2013. The RF unit 2016 is connected to the processor 2013 and transmits and/or receives radio or wireless signals. The UE 2020 includes a processor 2023, a memory 2024 and an RF unit 2021 and 1422. The processor 2023 can be configured to implement the procedures and/or methods proposed by the present invention. The memory 2024 is connected to the processor 2023 and stores various kinds of informations related to operations of the processor 2023. The RF unit 2021 and 2022 is connected to the processor 2023 and transmits and/or receives radio or wireless signals. The eNB 2010 110 and/or the UE 2020 can have a single antenna or multiple antennas.

The above-described embodiments may correspond to combinations of elements and features of the present invention in prescribed forms. And, it may be able to consider that the respective elements or features may be selective unless they are explicitly mentioned. Each of the elements or features may be implemented in a form failing to be combined with other elements or features. Moreover, it may be able to implement an embodiment of the present invention by combining elements and/or features together in part. A sequence of operations explained for each embodiment of the present invention may be modified. Some configurations or features of one embodiment may be included in another embodiment or can be substituted for corresponding configurations or features of another embodiment. And, it is apparently understandable that a new embodiment may be configured by combining claims failing to have relation of explicit citation in the appended claims together or may be included as new claims by amendment after filing an application. In this disclosure, a specific operation explained as performed by a base station can be performed by an upper node of the base station in some cases. In particular, in a network constructed with a plurality of network nodes including a base station, it is apparent that various operations performed for communication with a user equipment can be performed by a base station or other network nodes except the base station. In this case, 'base station' can be replaced by such a terminology as a fixed station, a Node B, an eNodeB (eNB), an access point and the like.

Embodiments of the present invention may be implemented using various means. For instance, embodiments of the present invention may be implemented using hardware, firmware, software and/or any combinations thereof. In case of the implementation by hardware, one embodiment of the present invention may be implemented by at least one of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, one embodiment of the present invention may be implemented by modules, procedures, and/or functions for performing the above-explained functions or operations. Software code may be stored in a memory unit and may be then drivable by a processor.

The memory unit may be provided within or outside the processor to exchange data with the processor through the various means known to the public As mentioned in the foregoing description, the detailed descriptions for the preferred embodiments of the present invention are provided to be implemented by those skilled in the art. While the present invention has been described and illustrated herein with reference to the preferred embodiments thereof, it will be apparent to those skilled in the art that various modifications and variations can be made therein without departing from the spirit and scope of the invention. For instance, the respective configurations disclosed in the aforesaid embodiments of the present invention can be used by those skilled in the art in a manner of being combined with one another. Therefore, the present invention is non-limited by the embodiments disclosed herein but intends to give a broadest scope matching the principles and new features disclosed herein.

It will be apparent to those skilled in the art that the present invention may be embodied in other specific forms without departing from the spirit and essential characteristics of the invention. Thus, the above embodiments should be considered in all respects as exemplary and not restrictive. The scope of the present invention should be determined by reasonable interpretation of the appended claims and the present invention covers the modifications and variations of this invention that come within the scope of the appended claims and their equivalents. The present invention is non-limited by the embodiments disclosed herein but intends to give a broadest scope that matches the principles and new features disclosed herein. And, it is apparently understandable that an embodiment is configured by combining claims failing to have relation of explicit citation in the appended claims together or can be included as new claims by amendment after filing an application.

INDUSTRIAL APPLICABILITY

The present invention can be applied to wireless communication devices such as a UE, a relay, an eNB and the like.

What is claimed is:
1. A method for transmitting and receiving signals by an evolved node B (eNB) in a wireless access system supporting full duplex radio (FDR), the method performed by the eNB and comprising:
  transmitting, to a user equipment (UE), an indicator indicating that UE-specific time division duplex (TDD) is applied;
  transmitting, to the UE, frame configuration information in accordance with the UE-specific TDD; and
  transmitting and receiving the signals to and from the UE on the basis of the frame configuration information,
  wherein the frame configuration information is set based on a restriction in which a first subframe is a downlink subframe, a second subframe is a special subframe, and the next subframe of the special subframe is allocated as an uplink subframe, wherein the frame configuration information indicates the number of consecutive uplink subframes allocated after the special subframe, and wherein when a configuration period of the frame configuration information corresponds to X subframes and X is larger than 2, the number of bits of the frame configuration information is set to an integer obtained by rounding up a value of $\log_2(X-2)$.

2. An evolved node B (eNB) for transmitting and receiving signals in a wireless access system supporting full duplex radio (FDR), comprising:

a radio frequency (RF) unit; and a processor, wherein the processor is configured to:

transmit, to a user equipment (UE), an indicator indicating that UE-specific time division duplex (TDD) is applied, transmit, to the UE, frame configuration information in accordance with the UE-specific TDD, and transmit and receive the signals to and from the UE on the basis of the frame configuration information and wherein the frame configuration information is set based on a restriction in which a first subframe is a downlink subframe, a second subframe is a special subframe, and the next subframe of the special subframe is allocated as an uplink subframe, wherein the frame configuration information indicates the number of consecutive uplink subframes allocated after the special subframe, and wherein when a configuration period of the frame configuration information corresponds to X subframes and X is larger than 2, the number of bits of the frame configuration information is set to an integer obtained by rounding up a value of $\log_2(X-2)$.

\* \* \* \* \*